(12) United States Patent
Mori et al.

(10) Patent No.: US 7,438,328 B2
(45) Date of Patent: Oct. 21, 2008

(54) QUICK CONNECTOR

(75) Inventors: Hiroyoshi Mori, Iwakura (JP);
Motohide Nishimura, Kani (JP);
Tetsuya Souji, Kiyosu (JP)

(73) Assignee: Tokai Rubber Industries, Ltd. (JP)

( * ) Notice: Subject to any disclaimer, the term of this patent is extended or adjusted under 35 U.S.C. 154(b) by 207 days.

(21) Appl. No.: 11/389,522

(22) Filed: Mar. 24, 2006

(65) Prior Publication Data
US 2006/0214420 A1   Sep. 28, 2006

(30) Foreign Application Priority Data
Mar. 25, 2005 (JP) .............................. 2005-089529
Mar. 25, 2005 (JP) .............................. 2005-089547

(51) Int. Cl.
*F16L 37/00* (2006.01)
(52) U.S. Cl. ....................................... 285/305; 285/321
(58) Field of Classification Search ................. 285/305, 285/308, 317, 404, 318, 321
See application file for complete search history.

(56) References Cited

U.S. PATENT DOCUMENTS

| | | | |
|---|---|---|---|
| 3,314,696 A | | 4/1967 | Ferhuson et al. |
| 4,884,829 A | * | 12/1989 | Funk et al. ..................... 285/24 |
| 5,855,399 A | * | 1/1999 | Profunser ..................... 285/305 |
| 5,857,718 A | * | 1/1999 | Kleinschmidt .............. 285/305 |
| 5,860,677 A | | 1/1999 | Martins et al. |
| 5,979,946 A | | 11/1999 | Petersen et al. |
| 6,371,528 B1 | | 4/2002 | Kimura |
| 6,554,322 B2 | * | 4/2003 | Duong et al. ................ 285/305 |
| 6,604,760 B2 | * | 8/2003 | Cresswell et al. ........... 285/305 |
| 6,676,172 B2 | * | 1/2004 | Alksnis ....................... 285/319 |
| 6,681,458 B2 | * | 1/2004 | Seymour ....................... 24/675 |
| 6,983,958 B2 | * | 1/2006 | Rautureau .................... 285/305 |
| 6,997,486 B2 | * | 2/2006 | Milhas ........................ 285/305 |
| 7,201,403 B2 | * | 4/2007 | Takayanagi et al. ......... 285/321 |
| 2003/0052484 A1 | | 3/2003 | Rautureau |
| 2004/0183301 A1 | | 9/2004 | Yoshida |

FOREIGN PATENT DOCUMENTS

| | | |
|---|---|---|
| DE | 10017679 | 9/2001 |
| EP | 0750152 | 12/1996 |
| EP | 1098128 | 5/2001 |
| FR | 2849492 | 7/2004 |
| JP | 06-207696 | 7/1994 |
| JP | 10-231980 | 9/1998 |
| JP | 2001-182881 | 7/2001 |
| JP | 2002-005375 | 1/2002 |
| JP | 2003-021287 | 1/2003 |
| JP | 2004-125034 | 4/2004 |
| JP | 2004-125166 | 4/2004 |
| JP | 2004-211812 | 7/2004 |
| JP | 2004-211891 | 7/2004 |
| JP | 2005-180687 | 7/2005 |

* cited by examiner

*Primary Examiner*—David E Bochna
(74) *Attorney, Agent, or Firm*—Andrus, Sceales, Starke & Sawall, LLP

(57) ABSTRACT

A quick connector is provided with a connector housing and a wire retainer. The connector housing has a retainer mounting portion which is formed with engagement slits. The wire retainer is mounted on the retainer mounting portion such that engaging arms enter the engagement slits and project in the retainer mounting portion. Each of the engaging slits has a width larger than a diameter of the engaging arm in order to generate a collision noise by collision between the engaging arm and the connector housing or the pipe upon completion of closing motion of the engaging arms.

4 Claims, 16 Drawing Sheets

QUICK CONNECTOR

BACKGROUND OF THE INVENTION

1. Field of the Invention

The present invention relates to a quick connector, for example, to be adapted for assembly in piping of an automobile.

2. Description of the Related Art

In a fluid piping system where a pipe and a hose are connected, a connector is used for connecting the pipe and the hose. In such piping system, the connector has a tubular connector housing including a connector portion at one axial end to be connected to the hose. And, for example, the pipe includes an inserting end portion on an inserting end thereof wherein an annular engagement projection is formed on and around an outer peripheral surface, retainer means is provided at the other axial end of the connector housing for snap-engagement, and thereby the connector is configured as quick connection type. Then, the inserting end portion of the pipe is inserted into an opening on an end of the connector housing so that the annular engagement projection snap-engages with the retainer means to provide locking relation between the pipe and the connector, thereby connection of the pipe and the connector is completed. In retainer means to be adapted for a connector of quick connecting type, namely a quick connector, such wire retainer (for example, a retainer formed from wire member) is often used as to be of U-shape or generally U-shape and have a pair of engaging arms. Here, a pair of engagement slits are formed in a connector housing at the other axial end in diametrically opposed relation, and the wire retainer is mounted on the other axial end of the connector housing or an outer periphery of the connector housing at the other axial end, starting from leading ends of the pair of the engaging arms, so that the engaging arms seat in the engagement slits so as to clip the connector housing (for example, refer to Patent Document 1). Application of such retainer means secures sufficient stability in mounting of a retainer to a connector housing even when a connector is sized relatively large in diameter.

[Patent Document 1] JP-A 2003-21287

By the way, in such type of a connector, the pipe is inserted in the connector housing without play in an axial direction in locking relation, and stable connection between the connector and the pipe is secured. For this purpose, a width of the engaging slit is designed generally equal to a diameter of the engaging arm. However, when the width of the engaging slit is designed equal to the diameter of the engaging arm, a great resistance to sliding movement is exerted by the engaging slits to the engaging arms of the wire retainer while the engaging arms close so as to engage with the annular engaging projection of the pipe, and snap-closing motion of the engaging arms becomes slow. As a result, there is fear that an operator cannot easily judge complete connection between the pipe and the connector. In case that the operator does not find complete connection therebetween, the operator repeats relative insertion of the pipe in the connector housing, and promptness is lowered in connecting work for piping.

And, the wire retainer which is mounted to the connector housing has to be retained in a mounted position for snap-engaging with the annular engaging projection of the pipe. Thus, the wire retainer is configured such that each engaging arm is bent over or inclined radially inward, for example, at a leading end thereof to define an engaging portion, and the engaging portion engages with an outer peripheral surface of the connector housing in a pull-out direction when the wire retainer is mounted to the connector housing.

In a configuration of such quick connector, the wire retainer is allowed to move in the pull-out direction when pulled in the pull-out direction. However, once the wire retainer dismounts from the connector housing, there is no stop or locking function with respect to the pipe. So, a stop portion is formed on the connector housing. In this configuration, when each of the leading end portions of the engaging arms or engaging portions engages with the stop portion in the pull-out direction, the wire retainer is not allowed to move further in the pull-out direction.

This configuration prevents dismounting of the wire retainer from the connector housing. However, when the wire retainer is moved in the pull-out direction, as the leading end portions (at least leading end portions) of the engaging portions slide over the outer peripheral surface of the connector housing, the pair of the engaging arms open, spread apart or move mutually apart gradually. So, it can happen that an external force is exerted to the wire retainer in use, the wire retainer moves in the pull-out direction, the pair of the engaging arms loose a stop or locking function with respect to the pipe, and thereby the pipe is disconnected from the quick connector.

Accordingly, it is an object of the present invention to provide a quick connector having a wire retainer with which a prompt connecting work for piping can be secured without particularly adversely affecting stable connection between the pipe and the connector. And, in one aspect of the present invention, it is an object to provide a quick connector also having a configuration that does not cause incomplete connection with the pipe during use.

SUMMARY OF THE INVENTION

In order to achieve a foregoing object, there is provided a novel quick connector for connecting a pipe and a hose. The quick connector for connecting the pipe and the hose comprises a tubular connector housing that is provided at one axial end with a hose connector portion for being connected to the hose and at the other axial end with a pair of diametrically opposed engaging slits, a wire retainer of U-shape or generally U-shape having a pair of engaging arms. The wire retainer is mounted to the other axial end of the connector housing in such a manner that the pair of the engaging arms clip the connector housing while extending through a respective one of the engaging slits. The engaging arms of the wire retainer project through the respective one of the engagement slits into the connector housing. The engaging arms are configured to be brought in opening motion with the engaging arms being pushed by an annular engaging projection formed on an inserting end of the pipe that is inserted into the connector housing, and then in closing motion so as to engage with the annular engaging projection. Each of the engaging slits has a width larger than a diameter of the engaging arm in order to generate a collision noise or collision sound by collision between the engaging arm and the connector housing or the pipe upon completion of the closing motion of the engaging arms. Generation of the collision noise allows an operator to verify completion of the closing motion of the engaging arms, namely complete connection between the pipe and the connector. The engaging slit with the width larger than the diameter of the engaging arm facilitates smooth snap-closing motion of the engaging arms. Here, when the wire retainer is made of metal and the connector housing and/or the pipe are also made of metal, a positive collision noise can be expected to be generated. For the connector where the engaging arms collides or bumps against the connector housing, for example, circumferential end portions of the engaging slits upon completion of the closing motion of the engaging arms, the connector housing may be made of metal. For the connector where the engaging arms collides or bumps against an outer periphery of the inserting end portion of the pipe (an outer periphery of the inserting end portion except for the annular engaging projection) upon completion of the closing motion thereof, the pipe may be made of metal. And the width of each of the engaging slits can be designed small (for example, minimum) an extent that the positive collision noise can be generated, and thereby stable connectability of the pipe with the connector can remain undisturbed.

Each of the engaging slits preferably has a width 1.1 times to 1.3 times larger than the diameter of the engaging arm. When each of the engaging slits has the width smaller than 1.1 times the diameter of the engaging arm, there is fear that smooth snap-closing motion of the engaging arms cannot be secured. When each of the engaging slits has the width larger than 1.3 times the diameter of the engaging arm, there is fear that the engaging arms have too large play or clearance relative to the engaging slits and thereby stable connectablility of the pipe with the connector is disturbed.

It is effective that the inserting end portion of the pipe is configured so as to be inserted in the connector housing, until an annular surface of the annular engaging projection at the other axial end conforms to or beyond one axial end extremity of the engaging slit. By virtue of this configuration, snap-closing motion of the engaging arms is prevented from being disturbed by resistance to sliding movement of the engaging arms that is provided by the annular surface of the annular engaging projection at the other axial end.

In the quick connector according to the present invention, each of the engaging arms may have a leading end portion that is bent over or inclined radially inward to define an engaging portion. And the wire retainer may be configured to move to a pull-out position where a leading end of the engaging portion engages a stop portion of the connector housing in a pull-out direction, while sliding the leading end of the engaging portion over an outer peripheral surface of the connector housing so as to gradually open the engaging arms. Further, the engaging portion may be formed not to allow the engaging arms of the wire retainer that reaches to the pull-out position to open so as to be disengaged from the annular engaging projection of the pipe, or may be formed to maintain engaging relation of the engaging arms of the wire retainer that reaches to the pull-out position with the annular engaging projection of the pipe. That is, the wire retainer may be configured such that the engaging relation of the engaging arms with the annular engaging projection of the pipe is maintained while the wire retainer is moved from the mounted position to the pull-out position. For example, the engaging portions engage with the outer peripheral surface of the connector housing, more specifically, the outer surfaces of the connector housing toward the mounting direction with respect to a center in the mounting and pull-out direction, in the pull-out direction and thereby the wire retainer can be maintained in the mounted position. According to one aspect of the present invention, since the wire retainer is constantly kept in a state that the engaging arms do not open so as to be disengaged from the annular engaging projection, the pipe can be effectively prevented from being disconnected from the connector.

In case of providing an axial portion on the leading end portion of the engaging portion that is bent over in the axial direction of the connector housing in view of safety, etc., the axial portion may be configured to engage with the stop portion of the connector housing in the pull-out direction. This configuration can secure a good stop effect with respect to the pipe.

In order to mount the wire retainer including the axial portions to the connector housing regardless of configuration of the engaging, preferably each of the engaging slits are provided with inlet and outlet portions extending in the axial direction, at circumferential end portions thereof, for passing the axial portions therethrough, and the wire retainer is mounted with the axial portion slipping in the inlet portion and out of the outlet portion. Here, at least the outlet portion is closed up, for example, with a bush or the like, at an inside of the connector housing after the wire retainer is mounted to or on the connector housing by inserting the axial portions in the inlet portions and projecting out from the outlet portions. In this configuration, the stop portion of the connector housing may be defined by each of circumferential end portions of the outlet portions.

According to one aspect of the present invention, there is provided a new quick connector for connecting a pipe and a hose, which comprises a tubular connector housing that is provided at one axial end with a hose connector portion for being connected to the hose and at the other axial end with a pair of diametrically opposed engaging slits, a wire retainer of U-shape or generally U-shape having a pair of engaging arms. The pair of the engaging arms are mounted to the other axial end of the connector housing, starting with leading end of the engaging arms, in such a manner that the pair of the engaging arms clip the connector housing while extending through a respective one of the engaging slits. The engaging arms of the wire retainer project through the respective one of the engagement slits into the connector housing and in a mounted position, the engaging arms snap-engage with an annular engaging projection formed on an inserting end portion of the pipe that is inserted in the connector housing. Each of the engaging arms has a leading end that is bent over or inclined radially inward to define an engaging portion. The wire retainer is configured to move to a pull-out position where a leading end of the engaging portion engages a stop portion of the connector housing in a pull-out direction, while sliding the leading end of the engaging portion over an outer peripheral surface of the connector housing so as to gradually open the engaging arms. The engaging portion is configured not to allow the engaging arms of the wire retainer that reaches to the pull-out position to open so as to be disengaged from the annular engaging projection of the pipe.

As described above, a quick connector according to the present invention facilitates smooth connecting work for piping since engaging arms generate discriminant sound or sound signal that allows an operator easily verify complete connection of the pipe with the connector. Furthermore, according to one aspect of the present invention, it becomes possible to provide quick connector also having a configuration free from fear that engagement relation between the pipe and the connector is cancelled during use.

Now, the preferred embodiments of the present invention will be described in detail with reference to the drawings.

DETAILED DESCRIPTION OF THE PREFERRED EMBODIMENTS

Figure 1:
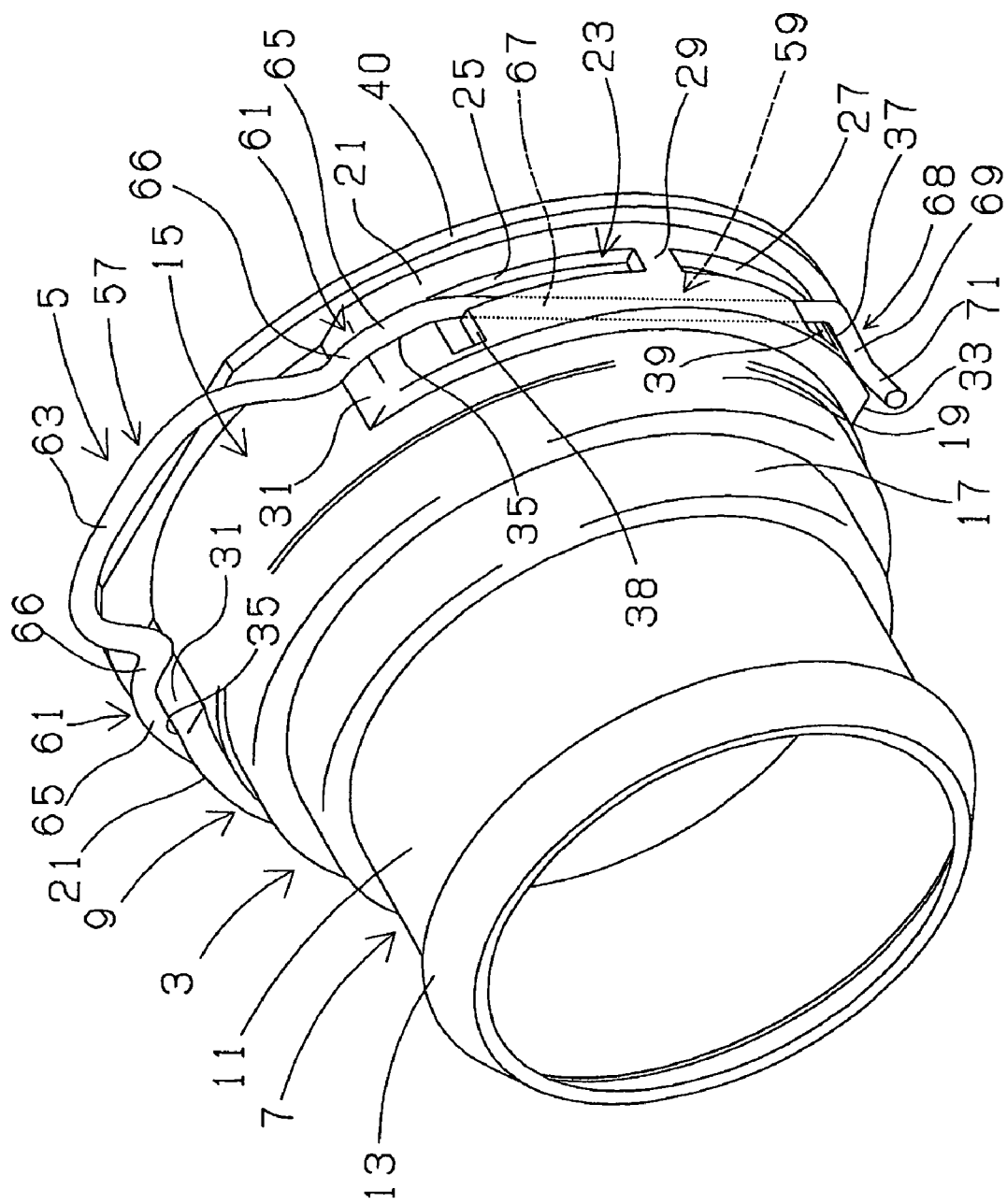
FIG. 1 is a perspective view of a first quick connector according to the present invention.
Figure 2:
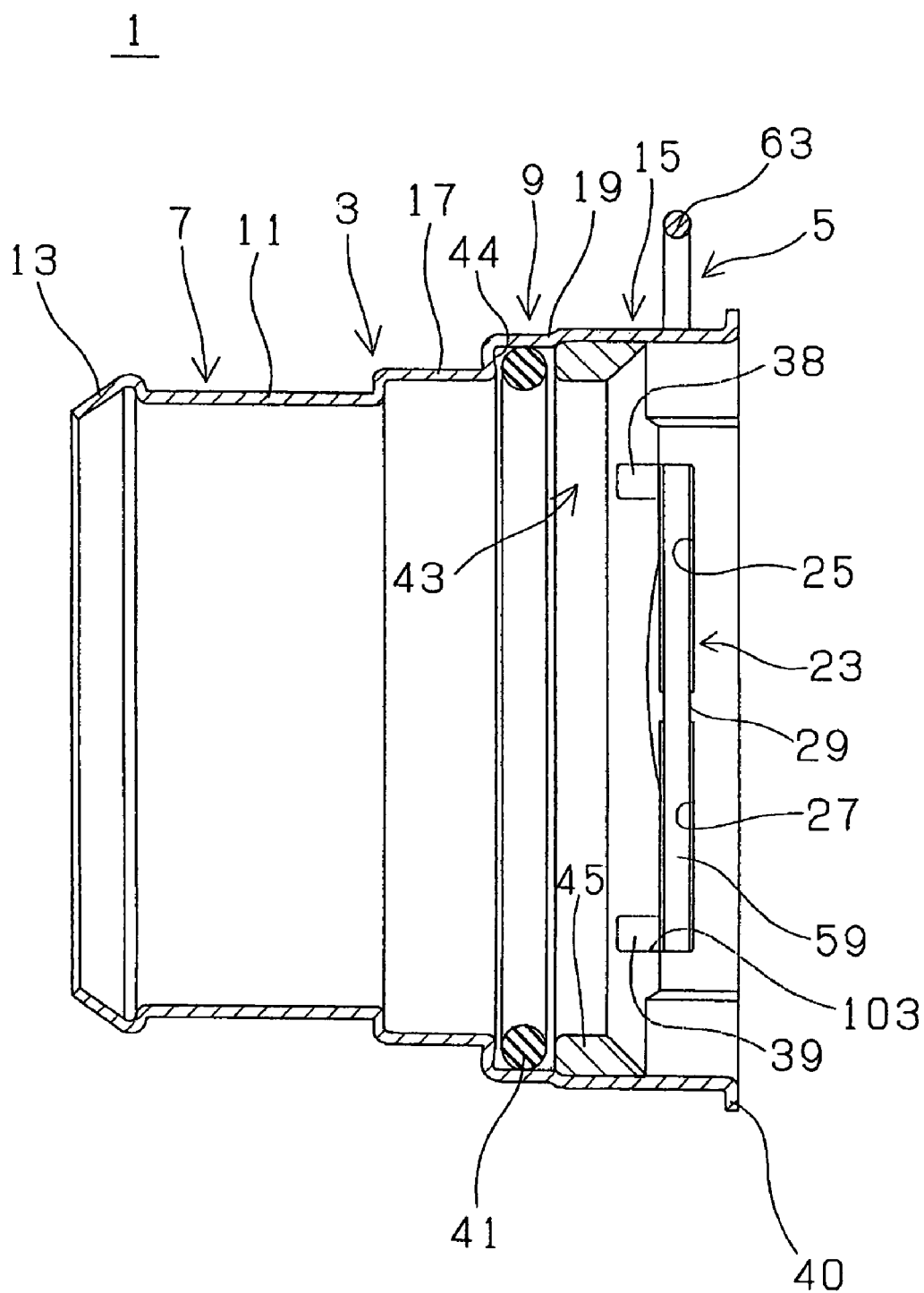
FIG. 2 is a sectional view of the first quick connector.
Figure 3:
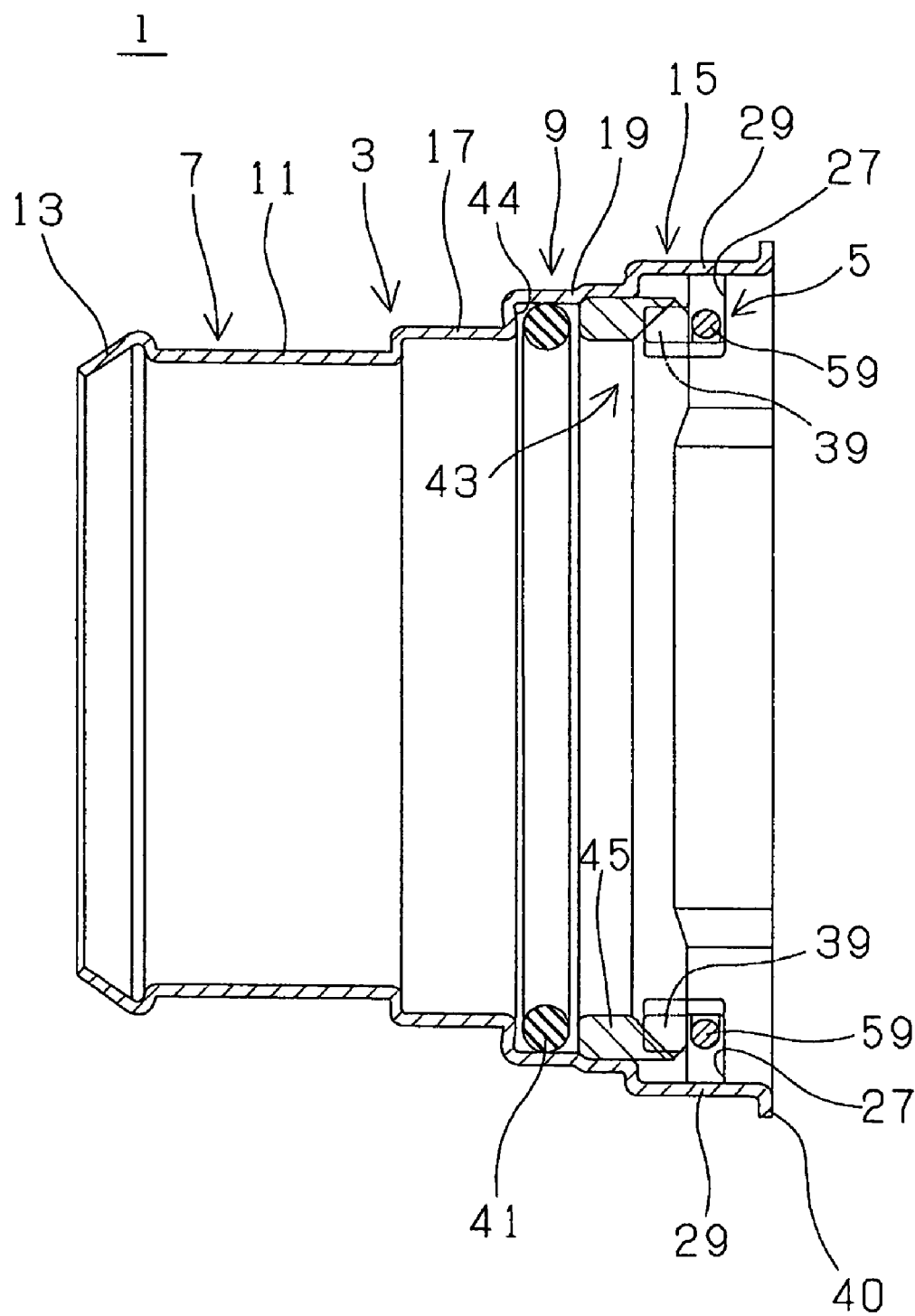
FIG. 3 is another sectional view of the first quick connector.

A first quick connector 1 shown in FIGS. 1 to 5 is adapted, for example, for assembly in air supply and exhaust piping of an automobile. As well understood specifically from FIGS. 1 to 3, the first quick connector 1 comprises a tubular connector housing 3 which is thin-walled, a first wire retainer 5 of U-shape or generally of U-shape mounted on or to the connector housing 3. The connector housing 3, for example, made of metal, has a cylindrical hose connector portion 7 (hose connector portion) at one axial end of the connector housing 3 (namely on one side in a direction of an axis thereof) and a generally cylindrical pipe inserting portion 9 at the other axial end of the connector housing 3 (namely on the other side in a direction of an axis thereof) as a unit. The connector housing 3 is formed large in diameter and relatively short in axial length to connect a hose of large diameter and a pipe of large diameter.

The hose connector portion 7 includes a cylindrical connector body 11 and a hose stopper portion 13 formed integrally on one axial end portion of the connector body 11. The hose stopper portion 13 is formed in curved manner so as to diametrically expand in reverse tapered shape from one axial end thereof toward the other axial end thereof and protrude radially outwardly from the connector body 11. Also, the hose stopper portion 13 is formed small in diameter at one axial end, for example, smaller in diameter than the connector body 11.

The pipe inserting portion 9 includes a retainer mounting portion 15 at the other axial end thereof, a pipe retaining portion 17 at one axial end thereof in connected relation with the hose connector portion 7 and a seal holding portion 19 located on axially intermediate portion between the retainer mounting portion 15 and the pipe retaining portion 17. The pipe retaining portion 17 is formed smaller in diameter than the seal holding portion 19, and larger in diameter than the connector body 11 of the hose connector portion 7.

The annular retainer mounting portion 15 of the pipe inserting portion 9 has the same diameter as the seal holding portion 19, more specifically, the same diameter as the other axial end of the seal holding portion 19. The annular retainer mounting portion 15 includes a pair of raised mounting portions 21, 21 having radially outer walls of shape like a part of cylindrical thin wall at diametrically symmetrical positions.

Each of the pair of the raised mounting portions 21, 21 is formed so as to extend for about a quarter of a circle (about one-fourth of the entire circumferential length of the annular retainer mounting portion 15). Or in some cases, the raised mounting portion 21 may be formed so as to extend an entire circle (the entire circumference of the annular retainer mounting portion 15). Each of the raised mounting portions 21, 21 is provided with an engagement slit 23 in the radially outer wall. The engagement slit 23 includes a first slit part (inlet slit portion) 25 at one circumferential end and a second slit part (outlet slit portion) 27 at the other circumferential end of the raised mounting portion 21. The first and the second slit parts 25, 27 are identical or symmetrical in shape with one another. The first and the second slit parts 25, 27 are arranged so as to leave or define a connecting bridge portion 29 therebetween. The connecting bridge portion 29 has a circumferential length generally equal to a width of the engagement slit 23, or slightly longer than the width of the engagement slit 23, for example, about twice the width of the engagement slit 23. That is, the engagement slit 23 is divided into the first slit part 25 and the second slit part 27 by the connecting bridge portion 29 which is located, for example, in a circumferential center thereof. And, a width (width in an axial direction of the first quick connector 1) of the raised mounting portion 21 is designed with length about three times, or three to four times the width (width in an axial direction of the first quick connector 1) of the engagement slit 23. Specifically, the width of the engagement slit 23 is set between 2.6 mm and 2.8 mm.

The raised mounting portion 21 includes a first end wall 31 at one circumferential end and a second end wall 33 at the other circumferential end thereof. The first and the second end walls 31, 33 are formed so as to expand parallel to a straight line passing through one and the other connecting bridge portions 29, 29 and a central axis, and parallel to an axis, namely so as to expand in a direction perpendicular to a mounting direction of the first wire retainer 5. A circumferential distance with length about twice the width of the engagement slit 23 is created each between the first end wall 31 and one circumferential end of the first slit part 25, and between the second end wall 33 and the other circumferential end of the second slit part 27 of the raised mounting portion 21. That is why on one circumferential end portion and the other circumferential end portion of the raised mounting portion 21, stop wall regions 35, 37 are defined, respectively. The stop wall regions 35, 37 have circumferential length or circumferential width about twice the width of the engagement slit 23.

In the raised mounting portion 21, the first slit part 25 is formed with a first axial in-and-outlet portion (here, serving as an inlet portion) 38 of slit or rectangular shape extending short in one axial direction in one circumferential end portion of the first slit part 25 continuously from the one circumferential end portion thereof and also a second axial in-and-outlet portion (here, serving as an outlet portion) 39 of slit or rectangular shape extending short in the one axial direction in the other circumferential end portion of the second slit part 27 continuously from the other circumferential end thereof.

The retainer mounting portion 15 of the connector housing 3 is formed into diametrically symmetrical shape so as to allow the first wire retainer 5 to be mounted also from a diametrically opposite side thereof similarly.

The retainer mounting portion 15 (or the pipe inserting portion 9 or the connector housing 3) is formed integrally with an outwardly directed flange 40 protruding radially outwardly on the other axial end thereof. The outwardly directed flange 40 is formed integrally on the other axial end (or edge) of the raised mounting portion 21. The outwardly directed flange 40 has a circular outer rim except at portions corresponding to between a pair of the raised mounting portions 21, 21. The outer rim of the outwardly directed flange 40 is formed straight at those portions corresponding to between the raised mounting portions 21, 21, as if cut out straight at outer side portions thereof.

In an inner peripheral surface of the seal holding portion 19, an O-ring 41 made of rubber is fitted at one axial end, while a bush 43, for example, made of metal is press-fitted at the other axial end thereof. The bush 43 is formed into a simple short cylindrical annular shape or in a simple short cylindrical shape. The O-ring 41 is axially retained by and in between the bush 43 and a stepped portion 44 formed on one axial end of the seal holding portion 19. The seal holding portion 19 has a slightly larger diameter at the other axial end thereof than at one axial end thereof.

Figure 4:
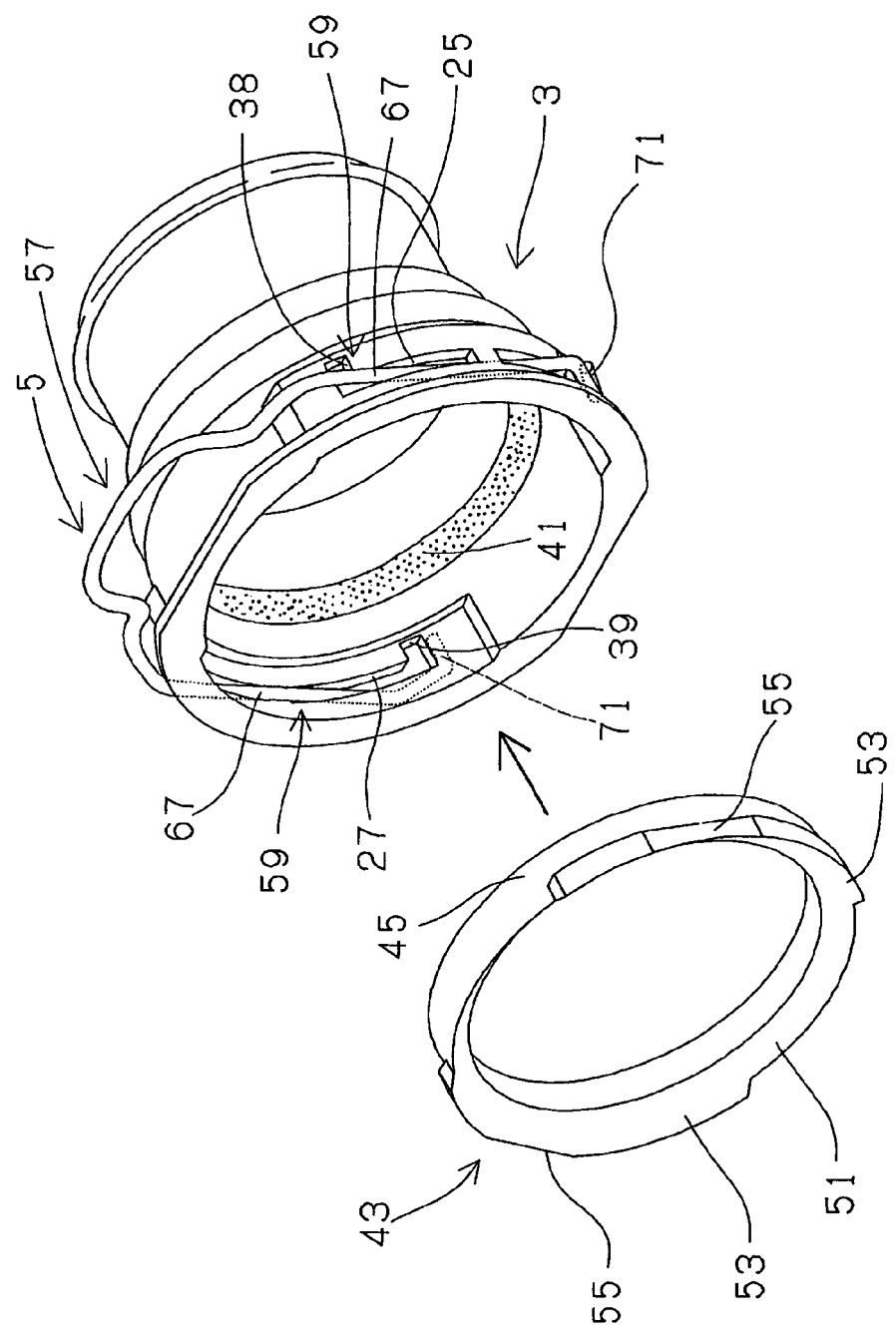
FIG. 4 is an exploded perspective view of the first quick connector.

As well shown in FIG. 4, the bush 43 is adapted in the first quick connector 1. The bush 43 integrally has a simple annular bush body 45, and a receptacle portion 51 for receiving the annular engaging projection 49 of the pipe 47 (refer to FIG. 6), at the other axial end of the bush body 45. The receptacle portion 51 includes an inner peripheral surface which expands diametrically in the other axial direction in reverse tapered manner so as to correspond to a tapered annular surface of one axial end of the annular engaging projection 49. The bush 43 further integrally includes block regions 53, 53 projecting slightly in the other axial direction in diametrically symmetrical positions of the receptacle portion 51. Each of the block regions 53, 53 has a circumferential length corresponding to the raised mounting portion 21, and includes an inner surface formed so as to be extended from the inner peripheral surface of the receptacle portion 51, and an outer surface corresponding to an inner peripheral surface or an inner surface of the raised mounting portion 21. The block regions 53, 53 project radially outwardly with respect to the bush body 45 and the receptacle portion 51 so as to seat in the raised mounting portions 21, 21, and to contact with the inner peripheral surface or the inner surface of the raised mounting portions 21, 21. However, a circumferential mid part (intermediate part) of a portion of each block region 53 to be seat in the raised mounting portion 21 is cut out to define passing-thorough portion 55. So, in this construction, when the bush 43 is fitted in the connector housing 3, the first in-and-outlet portions 38 of the first slit parts 25 and the second in-and-outlet portions 39 of the second slit parts 27 are closed up entirely or partly by outer peripheral surfaces or outer peripheries of the block regions 53, 53 which are in contact relation with the inner peripheral surfaces or the inner surfaces of the raised mounting portions 21, 21. Meanwhile, although the passing-through portions 55, 55 are formed at positions slightly toward one end in a mounting and pull-out direction of the first wire retainer 5 (i.e., refer to FIG. 8, the passing-through portions 55, 55 are formed at positions slightly upward) here, the passing-through portions 55, 55 may be formed at symmetrical positions in the mounting and pull-out direction.

Figure 5:
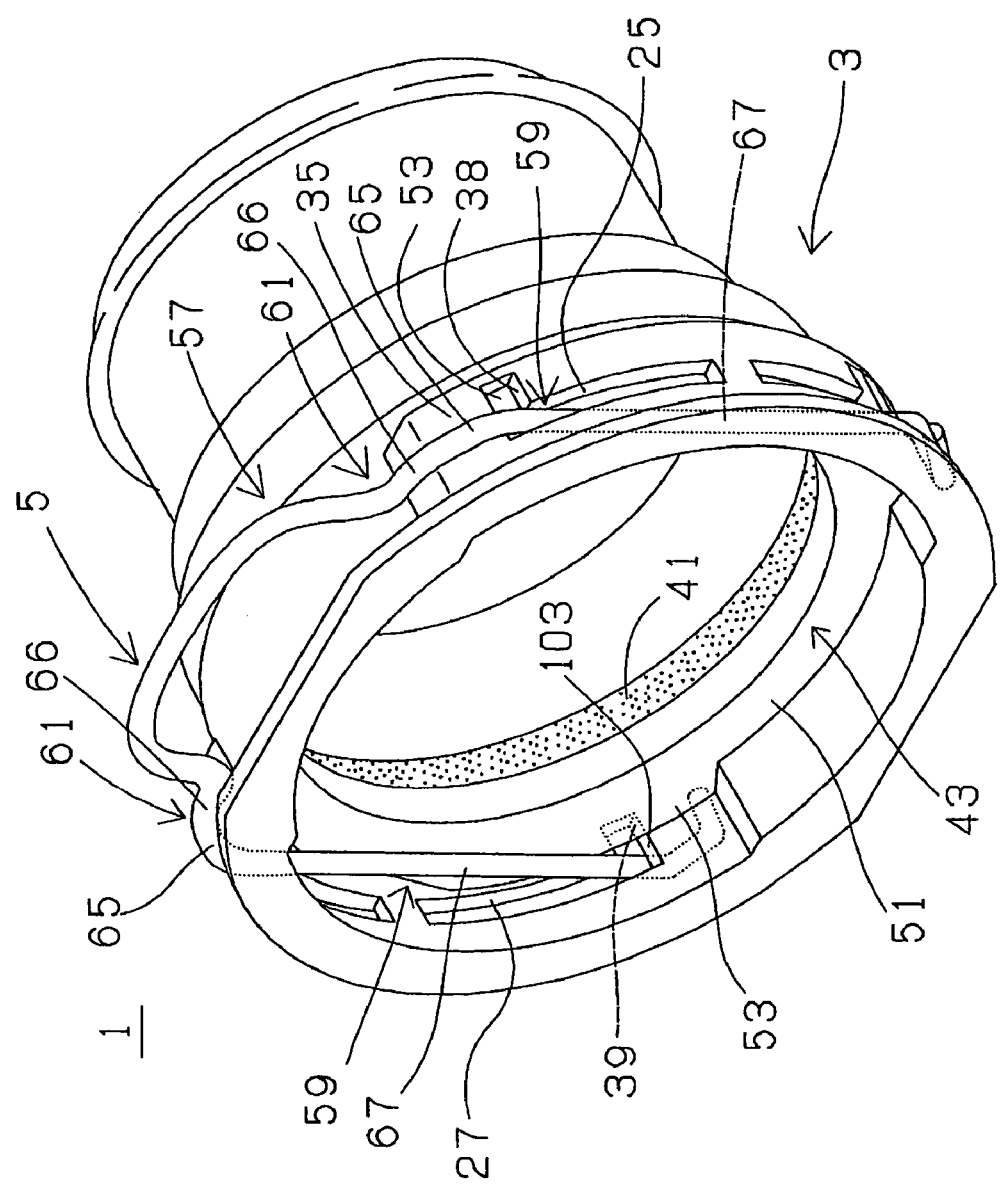
FIG. 5 is an assembly view of the first quick connector.

Specifically as shown in FIG. 5, the first wire retainer 5 is formed, for example, from a metal wire or wire member bent into a form so as to have a joining portion 57 and a pair of long engaging arms 59, 59 which extend linearly from opposite ends (widthwise opposite sides or widthwise opposite ends) of the joining portion 57 in parallel relation to one another, respectively. The joining portion 57 includes shoulders 61, 61 on opposite ends thereof, and a fingerhold portion 63 of U-shape, raised outwardly between the shoulders 61, 61. Each of the shoulders 61, 61 has a shoulder body 65 at an end of the engaging arm 59 for facilitating opening or spreading of the engaging arms 59, 59, and a stopper portion 66 at an end of the fingerhold portion 63. Each of the stopper portions 66, 66 is formed so as to curve in arcuate shape and in inwardly risen shape from a widthwise end or end portion of the fingerhold portion 63 and extend until oriented laterally outwardly, namely, oriented outwardly, and simultaneously generally perpendicular to an extending direction of the engaging arm 59 or to a mounting direction of the first wire retainer 5. The shoulder body 65 is ramped so as to correspond the stop wall region 35 at one circumferential end, and has a length equal to or generally equal to a circumferential length of the stop wall region 35.

Each of a pair of the engaging arms 59, 59 has a long arm body 67 which extends linearly from a leading end (an end opposite to the fingerhold portion 63) of the shoulder 61 or the shoulder body 65, and an engaging stopper portion 68 formed in inwardly curved manner integrally on a leading end (free end) of the arm body 67. Here, an outer diameter of a wire member of the first wire retainer 5, an outer diameter of the engaging arm 59 or an outer diameter of the arm body 67 is set 2.3 mm. The engaging stopper portion 68 has an engaging body 69 that is bent inwardly so as to correspond the stop wall region 37 at the other circumferential end, and has a length generally equal to a circumferential length of the stop wall region 37, and an axial portion 71 formed integrally on a leading end of the engaging body 69 so as to be bent in the one axial direction and extend in the one axial direction (generally one axial direction). The engaging bodies 69, 69 of the engaging stopper portions 68, 68 are designed or formed to contact or engage with the stop wall regions 37, 37 at the other circumferential end along or so as to follow outer surfaces of the stop wall regions 37, 37.

The arm body 67 has a length generally equal to the engagement slit 23, namely, generally equal to a distance between one circumferential end of the first slit part 25 and the other circumferential end of the second slit part 27. A distance between the arm bodies 67, 67 is set generally equal to an inner diameter of the pipe retaining portion 17, an inner diameter of the bush body 45 of the bush 43, or an outer diameter of the pipe 47.

In order to assemble thus constructed first quick connector 1 first, the first wire retainer 5 is inserted into the first slit part 25 of the connector housing 3. The first wire retainer 5 is mounted on or to the connector housing 3 such that the axial portions 71 of the engaging stopper portions 68 is inserted into the connector housing 3 through the first in-and-outlet portion 38 of the first slit part 25 and projected out of the connector housing 3 through the second in-and-outlet portion 39 of the second slit part 27. The first wire retainer 5 is mounted on the retainer mounting portion 15 of the connector housing 3 in a following manner. The shoulder bodies 65, 65 contact the stop wall regions 35, 35 at one circumferential end of the raised mounting portions 21, 21 respectively, along or so as to follow outer surfaces of the stop wall regions 35, 35. The stopper portions 66, 66 abut the first end walls 31, 31 of the raised mounting portions 21, 21 respectively, while the engaging stopper portions 68, 68 or the engaging bodies 69, 69 contact and engage with the stop wall regions 37, 37 of the other circumferential end of the raised mounting portions 21, 21 respectively, along or so as to follow outer surfaces of the stop wall regions 37, 37. Meanwhile, shoulder bodies 65, 65 may be designed to slightly rise from the stopper wall regions 35, 35 of one circumferential end of the raised mounting portions 21, 21, respectively. In order to project the axial portions 71 out of the second in-and-outlet portions 39 of the second slit parts 27 and to engage the engaging stopper portions 68, 68 or the engaging bodies 69, 69 with the stop wall regions 37, 37, insertion of the engaging arms 59, 59 is suspended, at the time when the axial portions 71, 71 come adjacent to the other circumferential ends or edges of the second slit parts 27, 27, and is resumed after resiliently deforming outwardly the engaging arms 59, 59, for example, so as to locate the axial end portions 71, 71 in the second in-and-outlet portions 39, 39. Then, the axial portions 71, 71 come out of the second slit parts 27, 27, the engaging bodies 69, 69 also come out of the second slit parts 27, 27, and engage with the stop wall regions 37, 37 in a pull-out direction, namely so as to exert resistance to pull-out motion. In this manner, the first wire retainer 5 is mounted on the first quick connector 1 or the connector housing 3 so as embrace or sandwich the retainer mounting portion 15 with a pair of the engaging arms 59, 59, while the stopper portions 66, 66 engage with the first end walls 31, 31 of the raised mounting portions 21, 21 in an inserting direction, namely so as to exert resistance to inserting motion, and the engaging stopper portions 68, 68 engage with the raised mounting portions 21, 21 in a pull-out direction. A pair of the engaging arms 59, 59 seat in the engagement slits 23, 23 with the arm bodies 67, 67 projecting in the connector housing 3. Here, due to abutment relation between the stopper portions 66, 66 and the first end walls 31, 31 of the raised mounting portions 21, 21, the pair of the engaging arms 59, 59 do not open, spread apart or move mutually apart so as to allow the annular engagement projection 59 of the pipe 47 to pass through, even when the first wire retainer 5 is further press inserted at this position.

Meanwhile, a distance between one circumferential ends of the fist slit parts 25, 25 is designed equal to a distance between the other circumferential ends of the second slit parts 27, 27, and generally equal to an outer diameter (an outer diameter of a portion except for the annular engaging projection 49) of the pipe 47 (more specifically, the distance between one circumferential ends of the fist slit parts 25, 25, and the distance between the other circumferential ends of the second slit parts 27, 27 is slightly larger than the outer diameter of the pipe 47). Therefore, the first wire retainer 5 is mounted on the retainer mounting portion 15 while the pair of the engaging arms 59, 59, more specifically, the pair of the arm bodies 67, 67 do not spread apart but extend parallel to one another.

And, as shown in FIG. 4, the first wire retainer 5 is moved in a retracting direction until just before the axial portions 71, 71 seat in the second in-and-outlet portions 39, 39, respectively, and is held in this state, then the bush 43 is force-fitted in the connector housing 3. In this state, a distance between the arm bodies 67, 67 of the wire retainer 5, or a distance between portions of the arm bodies 67, 67 projecting inside the connector housing 3 is generally equal to or slightly longer than a distance between the passing-through portions 55, 55 of the bush 43 (the arm bodies 67, 67 spread apart so as not to overlie or overlap on an outer rim or edge of the bush body 45). That is, as the engaging arms 59, 59 or the arm bodies 67, 67 open or spread apart sufficiently to allow the bush 43 to pass through therebetween or to allow the passing-through portions 55, 55 and the bush body 45 of the bush 43 to pass through therebetween, the bush 43 is allowed to pass through the first wire retainer 5 and to be force-fitted in the seal holding portion 19. In the first quick connector 1, since the closing portions 53 of the bush 43 closes up the first in-and-outlet portions 38 and the second in-and-outlet portions 39, for example, partly, the first wire retainer 5 never dismounts from the connector housing 3 as far as the bush 43 is removed from the connector housing 3.

Figure 6:
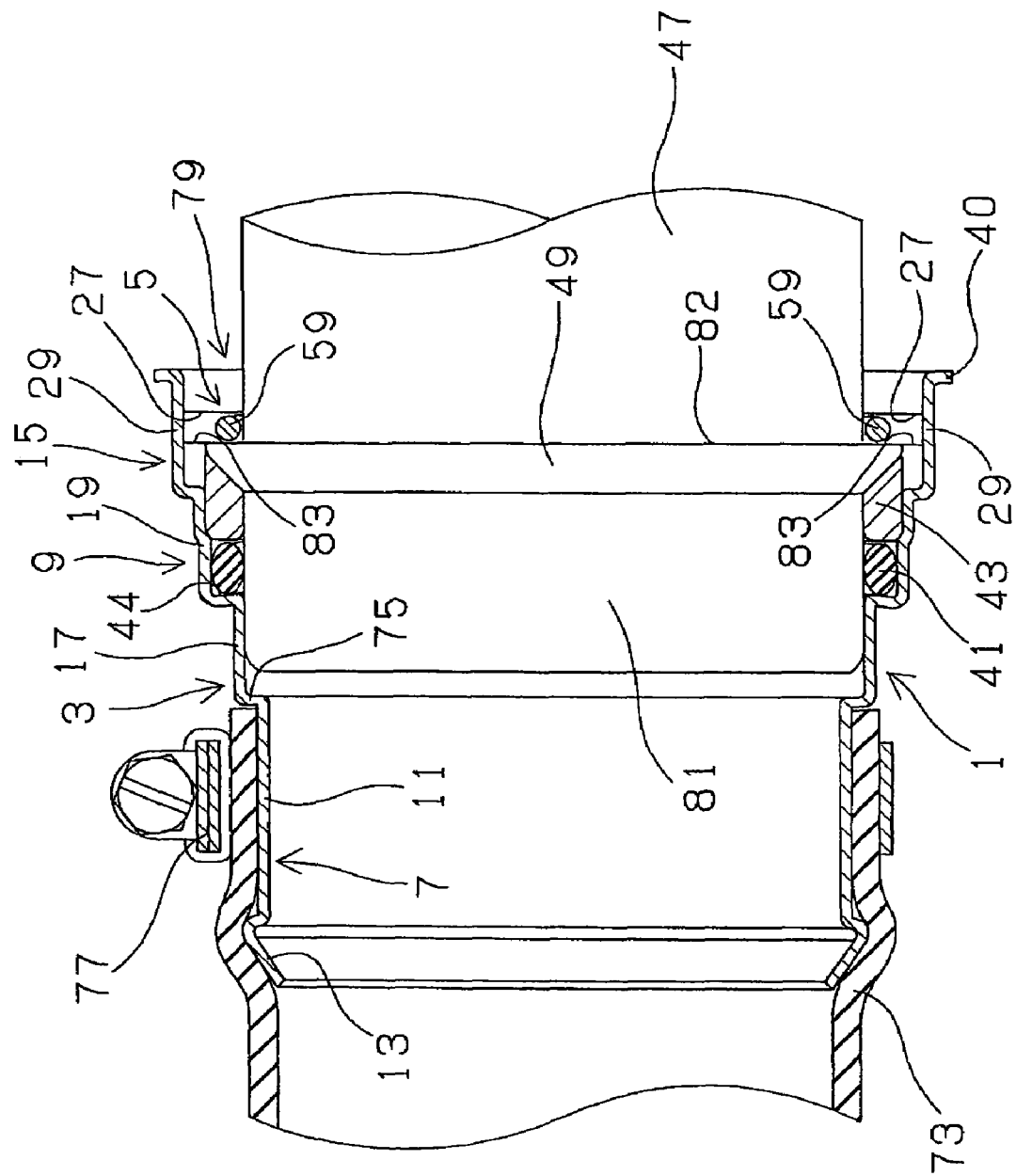
FIG. 6 is a sectional view taken in an axial direction, showing a state that a rubber hose and a pipe are connected to the first quick connector.

As specifically shown in FIG. 6, a rubber hose 73 is fitted on an outer periphery of the hose connector portion 7 so that a leading end or the other axial end of the hose 73 comes close to a stepped portion 75 formed in the pipe retaining portion 17 at one axial end thereof, and is tightened to the connector body 11 by a tightening band 77, and thereby is connected to the first quick connector 1 sufficiently in stop relation with respect thereto. Meanwhile, although the tightening band 77 is a screw type, a tightening band of a spring type may be also used. Further, instead of a band, a ring may be used. The ring is swaged onto the hose 73 to prevent the hose 73 from disconnection.

Figure 7:
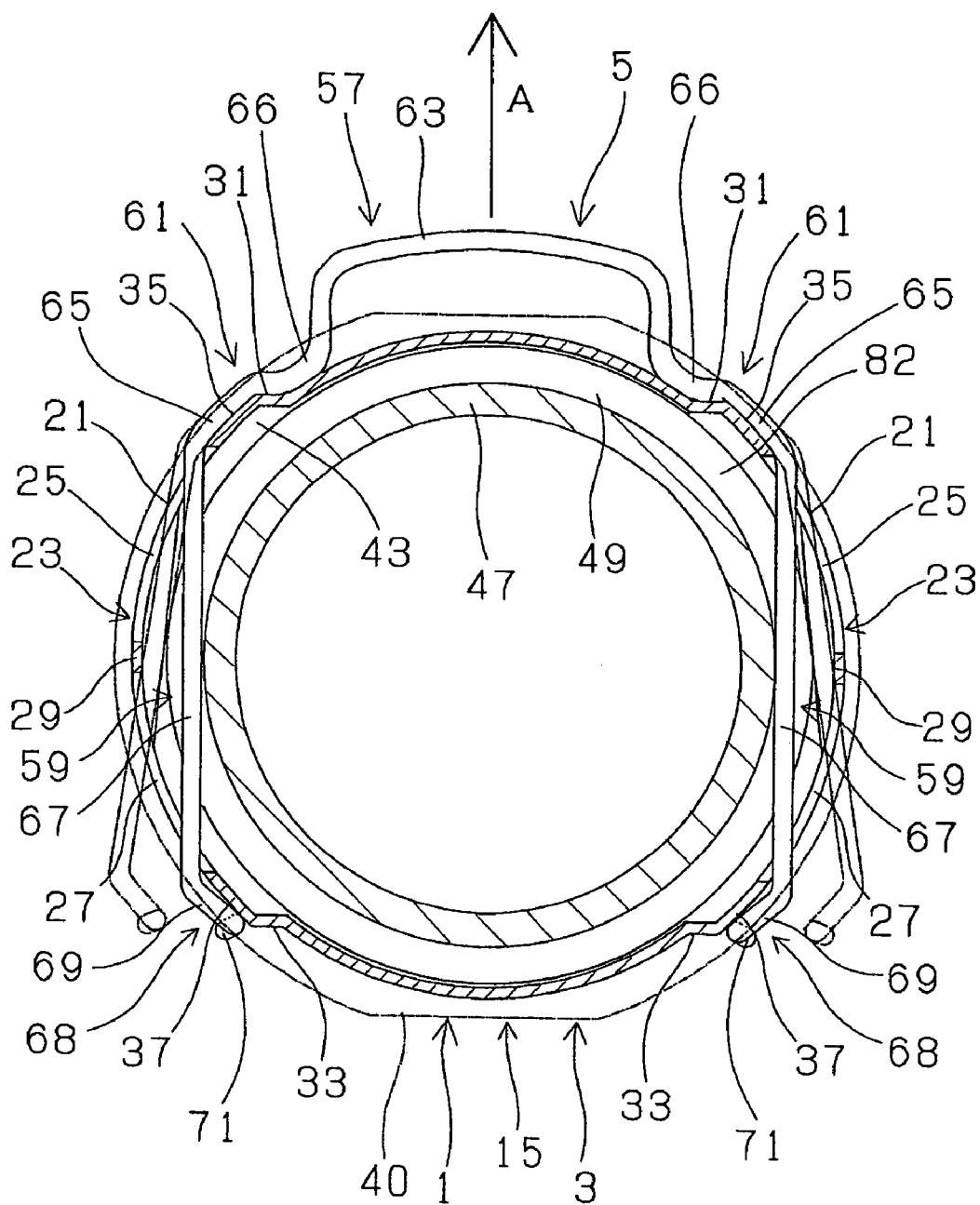
FIG. 7 is a sectional view taken in a radial direction, showing the state that the pipe is connected to the first quick connector

The pipe 47, for example, made of metal, is inserted into an opening 79 at an end of the retainer mounting portion 15 of the first quick connector 1 and fitted thereto. The pipe 47 has an inserting end portion 81 at one axial end thereof wherein an annular engaging projection 49 is formed on an outer peripheral surface. Here, the annular engaging projection 49 is formed so as to have an annular surface at one axial end, diametrically expanding in the other axial direction in a reverse tapered shape. The pipe 47 is pressure inserted into the first quick connector 1 or the connector housing 3 so that the annular surface of one axial end of the annular engaging projection 49 relatively progresses while expanding a distance between the arm bodies 67, 67 of the first wire retainer 5 (refer to the engaging arms 59 indicated in phantom line in FIG. 7), and then abuts and is received in an inner peripheral surface of the receptacle portion 51 of the bush 43, and the inserting end portion 81 is received over its entire length in the pipe inserting portion 9 of the connector housing 3. An annular surface 82 of the other axial end of the annular engaging projection 49 is formed so as to expand radially or in a direction perpendicular to an axis, and is located at a position axially corresponding to or generally corresponding to one axial end extremity 83 of the engagement slit 23 when the annular surface of the one axial end of the annular engaging projection 49 abuts the inner peripheral surface of the receptacle portion 51 of the bush 43. Therefore, as the pipe 47 is correctly inserted in the pipe inserting portion 9 of the connector housing 3, spring-back force allows the arm bodies 67, 67 of the first wire retainer 5 to snappingly return to an original parallel relation and snap-engage with the annular engaging projection 49 or the annular surface 82 of the other axial end of the annular engaging projection 49 so as to stop the pipe 47 from relative axial movement out of the first quick connector 1. Since a width of the engaging slit 23 is designed larger than a diameter of the arm body 67 (by 10% to 25% of the diameter of the arm body 67), the arm bodies 67 implement a positive snap action, the engaging stopper portions 68, 68 conflict the stop wall regions 37 of the connector housing 3 to generate a positive confliction noise. Here, the arm bodies 67 are not configured to conflict the outer periphery of the pipe 47. However, the arm bodies 67 may be configured to conflict the pipe 47 to generate a confliction noise.

One axial end of the inserting end portion 81 of the pipe 47 reaches in the pipe retaining portion 17 beyond or through the O-ring 41 and thereby a seal is formed by the O-ring 41 between the pipe 47 or the inserting end portion 81 of the pipe 47 and the first quick connector 1 or the connector housing 3. One axial end of the inserting end portion 81 with respect to the annular engaging projection 49 is retained by the pipe retaining portion 17 and the bush 43 without play in a radial direction. In order to ensure snap-engagement of the annular engaging projection 49 of the pipe 47 with the engaging arms 59, 59 or the arm bodies 67, 67, and in order to prevent slow down of snap-action of the engaging arms 59, 59 or the arm bodies 67, 67 due to slide movement of the engaging arms 59, 59 or the arm bodies 67, 67 over the annular engaging projection 49, the annular engaging projection 49 may be configured such that the annular surface of the other axial-end of the annular engaging projection 49 is located slightly toward one axial direction with respect to the one axial end extremity 83 of the engagement slit 23 when the annular surface of the one axial end thereof is received in the bush 43.

Figure 8:
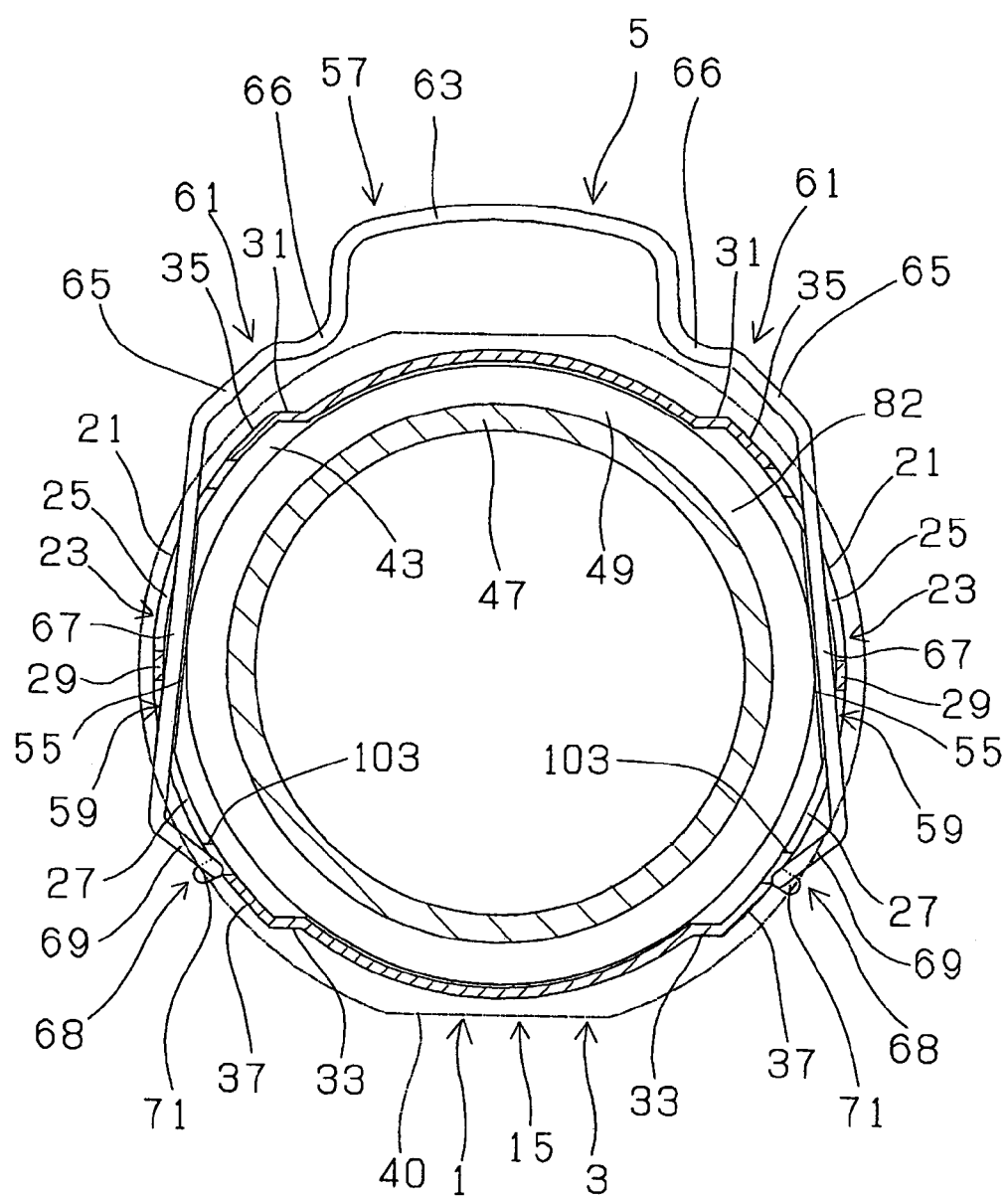
FIG. 8 is a view for explaining an operating manner of a first wire retainer for the first quick connector.

In the event of removing the pipe 47 from the first quick connector 1, pull-force or retracting force (refer to an arrow A in FIG. 7) is exerted to the fingerhold portion 63 of the first wire retainer 5 which is retained in a mounted position (position shown in FIG. 7) in a pull-out direction or retracting direction (namely opposite to a mounting direction), for example, by lifting the fingerhold portion 63 with fingers. Then, as shown in FIG. 8, the first wire retainer 5 moves in a retracting direction and the engaging arms 59, 59 gradually open or spread apart while sliding the engaging bodies 69, 69 of the engaging arms 59, 59 toward the second slit parts 27, 27 over an outer surface of the stop wall regions 37, 37 of the other circumferential end of the raised mounting portions 21, 21, respectively. The first wire retainer 5 is further pulled until the arm bodies 67, 67 abut and are firmly pressed against the connecting bridge portions 29, 29, and the first wire retainer 5 is not allowed to move yet further in the retracting direction beyond that position (retracted position shown in FIG. 8). However, in this state, namely in a retracted state, the engaging arms 59, 59 spread apart to such an extent as to permit the annular engaging projection 49 of the pipe 47 to pass through therebetween. Here, the axial portions 71 are formed so as to rise slightly from outer surfaces of the stop wall regions 37, 37 of the other circumferential end of the raised mounting portions 21, 21 (more concretely, as the case may be, only curve start parts of the axial portions 71, 71 contact, engage with or slide over the outer surfaces of the stop wall regions 37, 37). However, the axial portions 71, 71 may be formed to entirely slide over the outer surfaces of the stop wall regions 37, 37.

As well shown in FIG. 8, in this retracting state, the leading ends of the engaging bodies 69, 69 of the engaging stopper portions 68, 68 are out of the stop wall regions 37, 37 and are slipped into or about to be slipped into the second slit parts 27, 27 respectively. As the second in-and-outlet portions 39, 39 are blocked or closed up by outer peripheral surfaces or outer surfaces of the blocking regions 53, 53 of the bush 43, for example, partly, the axial portions 71, 71 do not enter in the connector housing 3. However, the axial portions 71, 71 (the curve start parts or ends of the curve start parts of the axial portions 71, 71) engage the other circumferential ends of the second in-and-outlet portions 39, 39 of the second slit parts 27, 27, or the other circumferential ends of the second slit parts 27, 27 in a mounting direction, respectively (the axial portions 71, 71 are angled, for example outwardly, toward the leading ends). So, even when the retracting force is released from the first wire retainer 5, the first wire retainer 5 is still maintained in the retracted position. In order to return the first wire retainer 5 from the retracting state or retracted position to the mounted position, the first wire retainer 5 is pushed in the mounting direction strongly and thereby the axial portions 71, 71 of the engaging stopper portions 68, 68 are forced out of the second slit parts 27, 27 and the second in-and-outlet portions 39, 39 or out of the second slit parts 27, 27 onto the outer surfaces of the stop wall regions 37, 37, or toward the outer surfaces of the stop wall regions 37, 37. Or, the axial portions 71, 71 are moved outwardly, and the leading ends of the engaging bodies 69, 69 of the engaging stopper portions 68, 68 are forced out of the second slits 27, 27 onto the outer surface of the stop wall regions 37, 37. Then, the first wire retainer 5 smoothly moves or returns to the mounted position with assistance of spring back force of the engaging arms 59, 59 to their original parallel relation.

A second quick connector 87 shown in FIGS. 9 to 13 is adapted, for example, also for assembly in air supply and exhaust piping of an automobile. The second quick connector 87 is constructed by modifying construction of the first wire retainer 5 of the first quick connector 1. Other construction and elements are the same as in the first quick connector 1, including a pipe 47 and a rubber hose 73. Therefore, elements identical to the first quick connector 1 are indicated with reference numerals identical to the first quick connector 1, and a redundant explanation on the elements are omitted in many cases.

Figure 9:
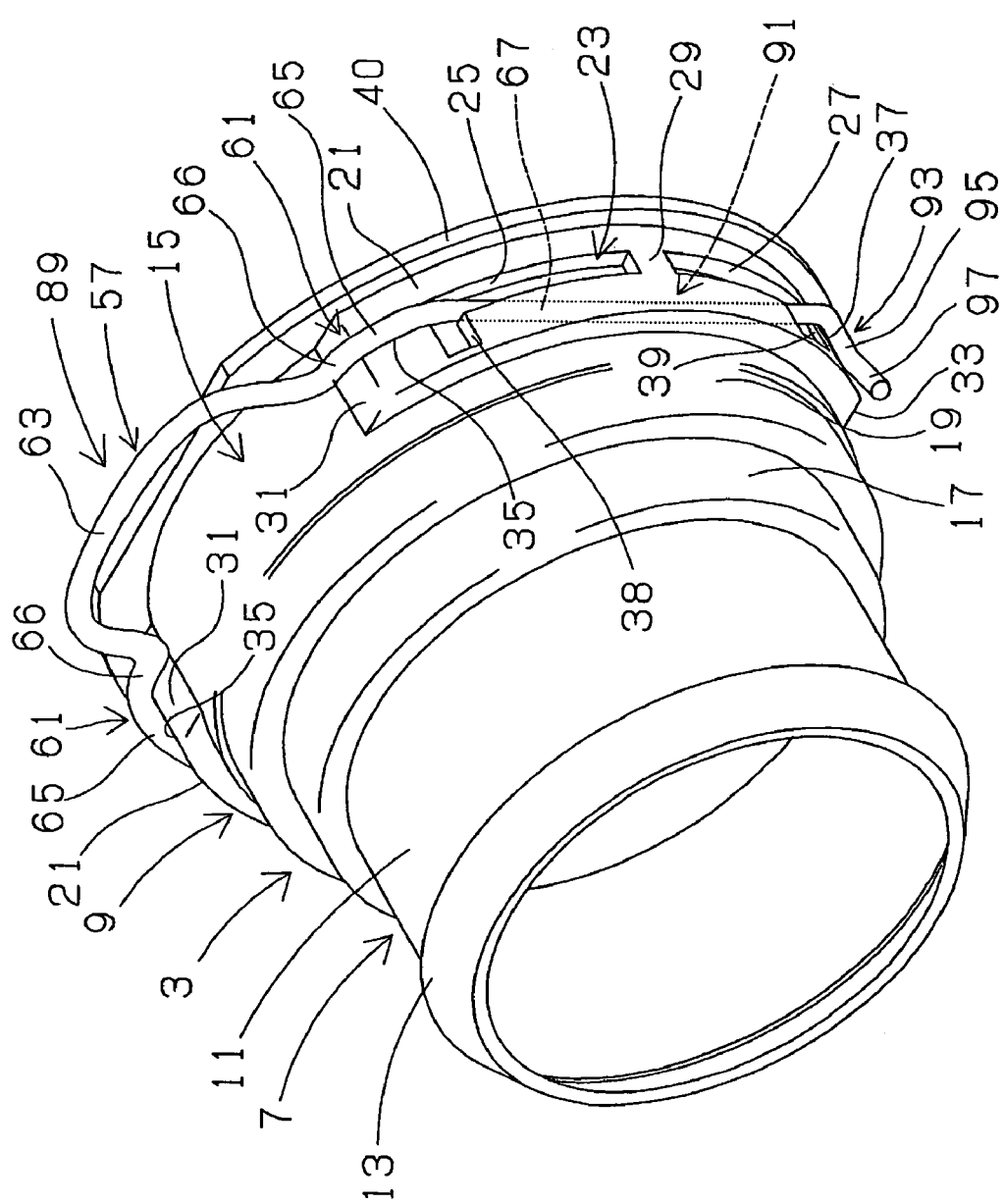
FIG. 9 is a perspective view of a second quick connector according to the present invention.
Figure 10:
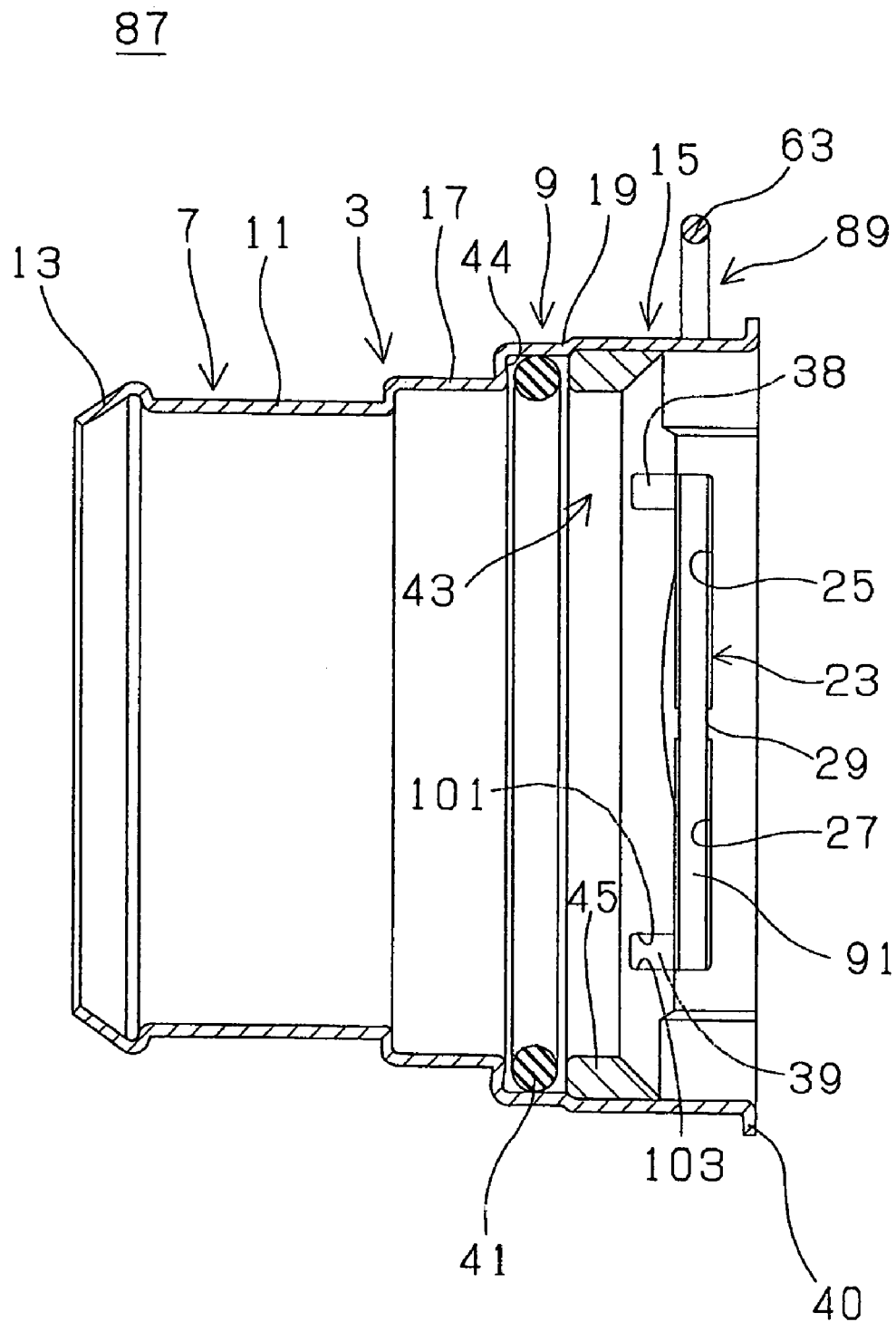
FIG. 10 is a sectional view of the second quick connector.
Figure 11:
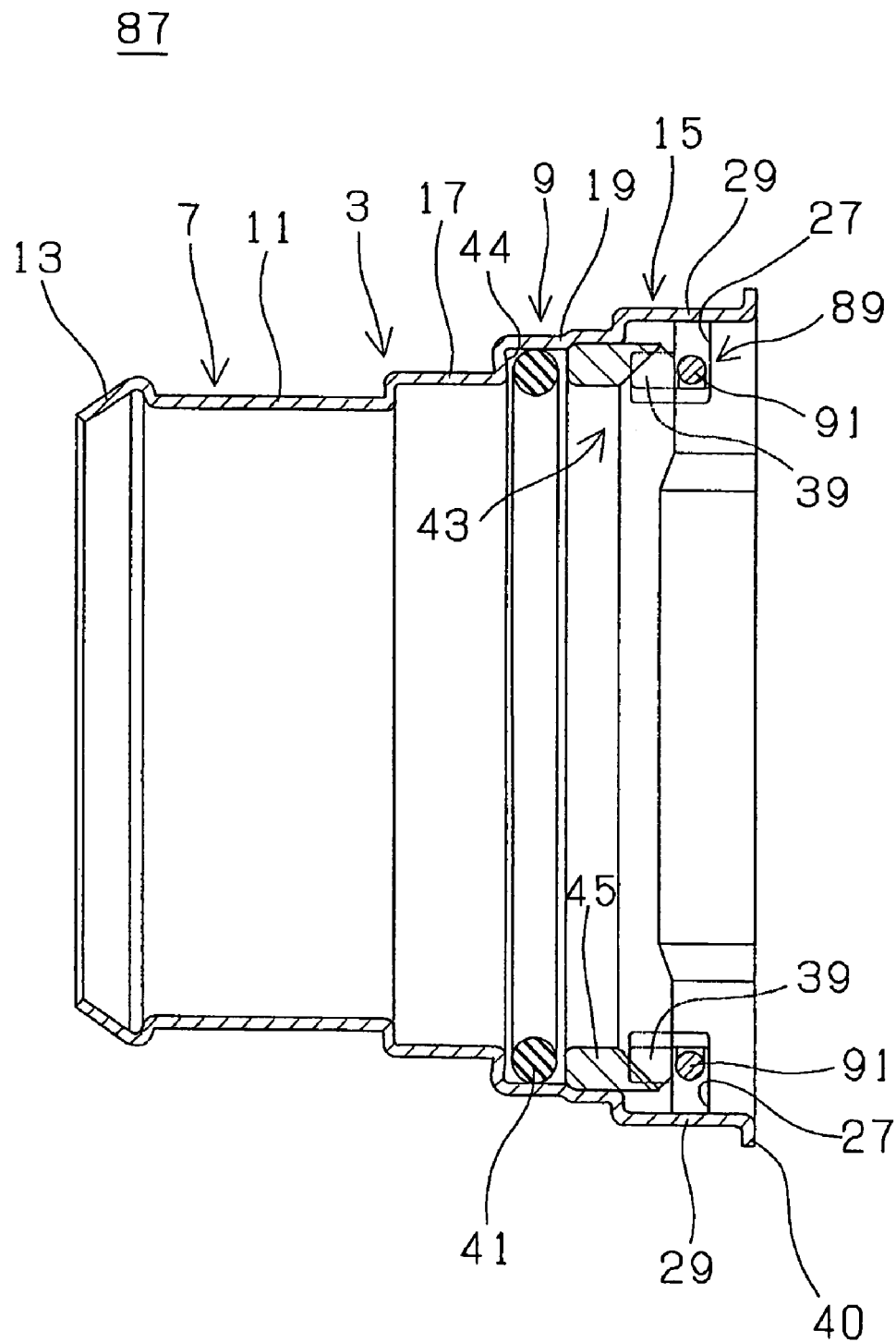
FIG. 11 is another sectional view of the second quick connector.

As well shown in particular in FIGS. 9 to 11, the second quick connector 87 comprises a tubular connector housing 3 which is thin-walled, and a second wire retainer 89 of U-shape or generally of U-shape mounted on or to the connector housing 3.

Figure 13:
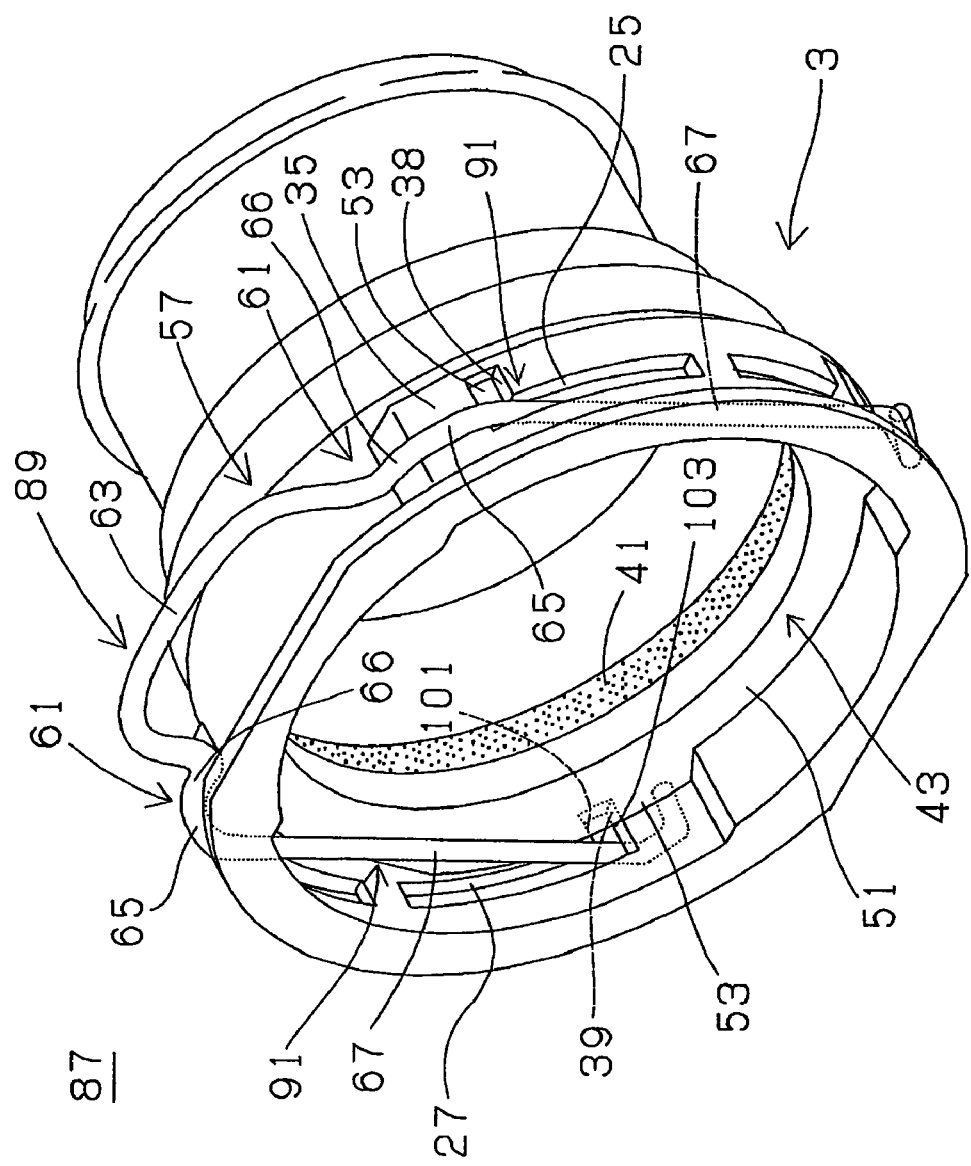
FIG. 13 is an assembly view of the second quick connector.

Specifically as shown in FIG. 13, the second wire retainer 89 is formed, for example, from a metal wire or wire member bent into a form so as to have a joining portion 57 and a pair of engaging arms 91, 91 which extend linearly from opposite ends (widthwise opposite sides or widthwise opposite ends) of the joining portion 57 in parallel relation to one another, respectively. The joining portion 57 includes shoulders 61, 61 on opposite ends thereof, and a fingerhold portion 63 of U-shape, raised outwardly between the shoulders 61, 61. Each of the shoulders 61, 61 has a shoulder body 65 at an end of the engaging arm 91 for facilitating opening or spreading of the engaging arms 91, 91, and a stopper portion 66 at an end of the fingerhold portion 63. Each of the stopper portions 66, 66 is formed so as to curve in arcuate shape and in inwardly risen shape from a widthwise end or end portion of the fingerhold portion 63 and extend until oriented laterally outwardly, namely, oriented outwardly, and simultaneously generally perpendicular to an extending direction of the engaging arm 91 or to a mounting direction of the second wire retainer 89. The shoulder body 65 is ramped so as to correspond the stop wall region 35 at one circumferential end, and has a length equal to or generally equal to a circumferential length of the stop wall region 35.

Each of a pair of the engaging arms 91, 91 has a long arm body 67 which extends linearly from a leading end (an end opposite to the fingerhold portion 63) of the shoulder 61 or the shoulder body 65, and an engaging stopper portion 93 formed in inwardly curved manner integrally on a leading end (free end) of the arm body 67. The engaging stopper portion 93 of the engaging arm 91 has an engaging body 95 that is inclined inwardly so as to correspond the stop wall region 37 of the raised mounting portion 21 at the other circumferential end, and has a length shorter than a circumferential length of the stop wall region 37 (for example, half the circumferential length of the stop wall region 37), and an axial portion 97 formed integrally on a leading end or leading end portion of the engaging body 95 so as to be bent in the one axial direction and extend in the one axial direction (generally one axial direction). The engaging bodies 95, 95 of the engaging stopper portions 93, 93 are designed or formed to contact or engage with the stop wall regions 37, 37 at the other circumferential end.

The arm body 67 has a length generally equal to the engagement slit 23, namely, generally equal to a distance between one circumferential end of the first slit part 25 and the other circumferential end of the second slit part 27. A distance between the arm bodies 67, 67 is set generally equal to an inner diameter of the pipe retaining portion 17 of the connector housing 3, an inner diameter of the bush body 45 of the bush 43, or an outer diameter of the pipe 47.

In order to assemble thus constructed second quick connector 87, first, the second wire retainer 89 is inserted into the first slit part 25 of the connector housing 3. The second wire retainer 89 is mounted on or to the connector housing 3 such that the axial portions 97 of the engaging stopper portions 93 is inserted into the connector housing 3 through the first in-and-outlet portion (here, serving as an inlet portion) 38 of the first slit part 25 and projected out of the connector housing 3 through the second in-and-outlet portion (here, serving as an outlet portion) 39 of the second slit part 27. The second wire retainer 89 is mounted on the retainer mounting portion 15 of the connector housing 3 in a following manner. The shoulder bodies 65, 65 contact the stop wall regions 35, 35 at one circumferential end of the raised mounting portions 21, 21 respectively, along or so as to follow outer surfaces of the stop wall regions 35, 35. The stopper portions 66, 66 abut the first end walls 31, 31 of the raised mounting portions 21, 21 respectively, while the engaging stopper portions 93, 93 or the engaging bodies 95, 95 (leading end portions) contact and engage with the stop wall regions 37, 37 of the other circumferential end of the raised mounting portions 21, 21 respectively. Meanwhile, shoulder bodies 65, 65 may be designed to slightly rise from the stopper wall regions 35, 35 of one circumferential end of the raised mounting portions 21, respectively. In order to project the axial portions 97 out of the second in-and-outlet portions 39 of the second slit parts 27 and to engage the engaging stopper portions 93, 93 or the engaging bodies 95, 95 with the stop wall regions 37, 37, insertion of the engaging arms 91, 91 is suspended, at the time when the axial portions 97, 97 come adjacent to the other circumferential ends or edges of the second slit parts 27, 27, and is resumed after resiliently deforming outwardly the engaging arms 91, 91, for example, so as to locate the axial portions 97, 97 in the second in-and-outlet portions 39, 39. Then, the axial portions 97, 97 come out of the second slit parts 27, 27, the engaging bodies 95, 95 also come out of the second slit parts 27, 27, and engage with the stop wall regions 37, 37 in a pull-out direction, namely so as to exert resistance to pull-out motion. In this manner, the second wire retainer 89 is mounted on the second quick connector 87 so as embrace or sandwich the retainer mounting portion 15 with a pair of the engaging arms 91, 91, while the stopper engaging portions 66, 66 engage with the first end walls 31, 31 of the raised mounting portions 21, 21 in an inserting direction, namely so as to exert resistance to inserting motion, and stop engaging portions 93, 93 engage with the raised mounting portions 21, 21 in a pull-out direction. A pair of the engaging arms 91, 91 seat in the engagement slits 23, 23 with the arm bodies 67, 67 projecting in the connector housing 3. Here, due to abutment relation between the stopper portions 66, 66 and the first end walls 31, 31 of the raised mounting portions 21, 21, the pair of the engaging arms 91, 91 do not open, spread apart or move mutually apart so as to allow the annular engagement projection 49 of the pipe 47 to pass through, even when the second wire retainer 89 is further press inserted at this mounted position.

Meanwhile, a distance between one circumferential ends of the fist slit parts 25, 25 is designed equal to a distance between the other circumferential ends of the second slit parts 27, 27, and generally equal to an outer diameter of the pipe 47. Therefore, the second wire retainer 89 is mounted on the retainer mounting portion 15 while the pair of the engaging arms 91, 91, more specifically, the pair of the arm bodies 67, 67 do not open or spread apart but extend parallel to one another.

Figure 12:
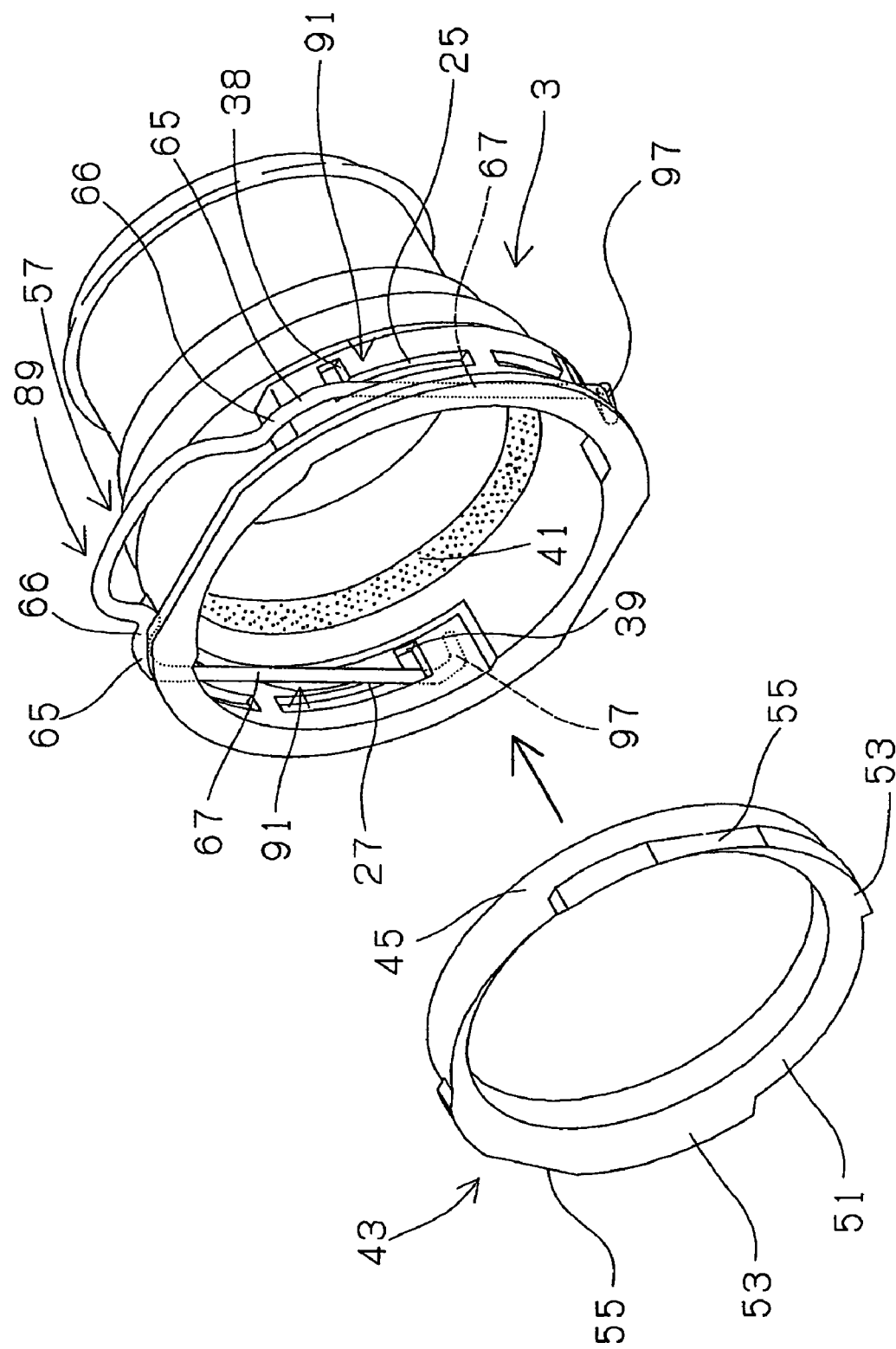
FIG. 12 is an exploded perspective view of the second quick connector.
Figure 15:
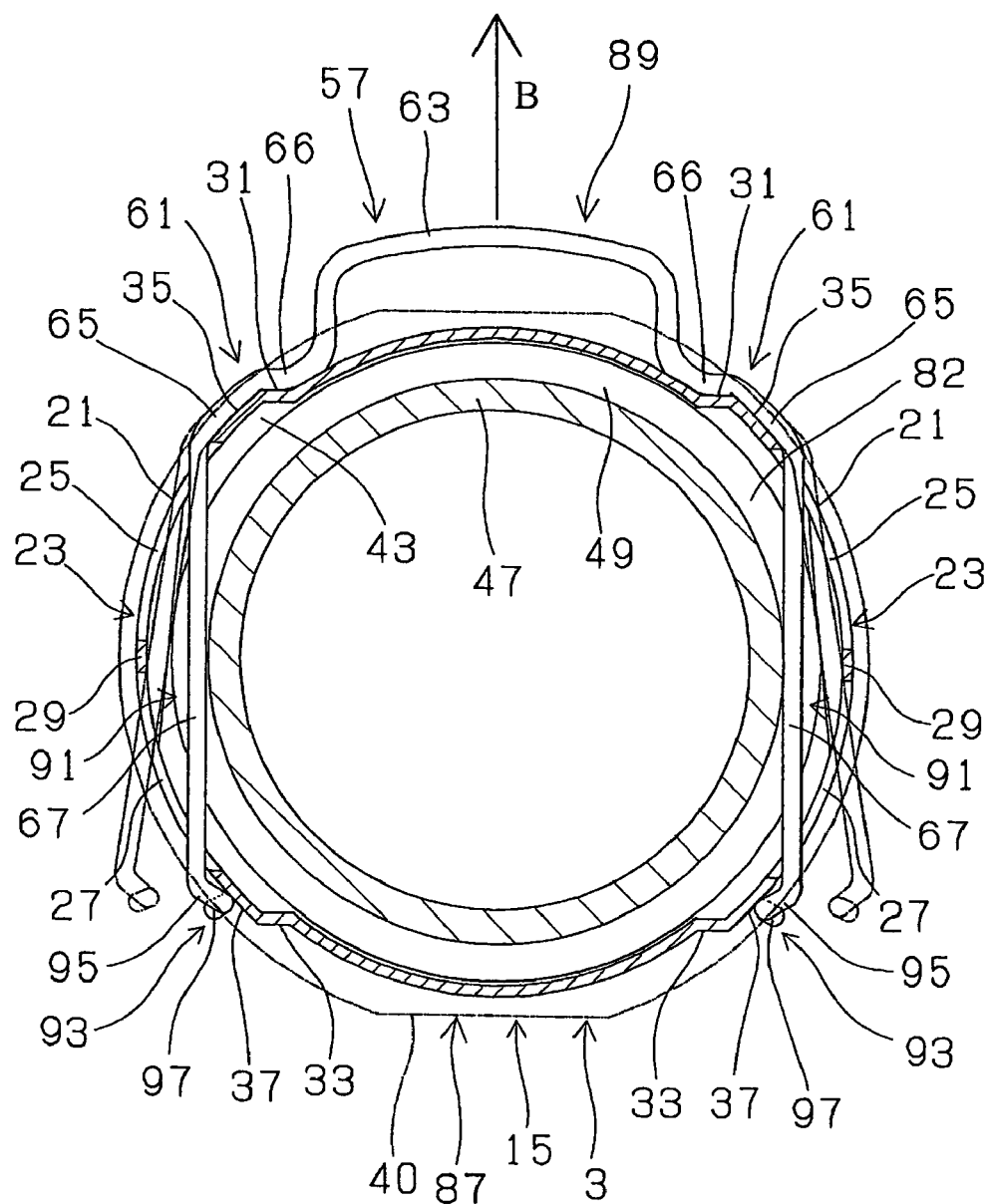
FIG. 15 is a sectional view taken in a radial direction, showing the state that the pipe is connected to the second quick connector

And, in a state as shown in FIG. 12, the engaging arms 91, 91 are deformed to its open state as indicated by phantom line in FIG. 15, and the bush 43 is pressure inserted in the connector housing 3. A distance between the arm bodies 67, 67 of the second wire retainer 89 that is deformed to its open state is generally equal to or slightly longer than a distance between the passing-through portions 55, 55 of the bush 43 (the arm bodies 67, 67 spread apart so as not to overlie or overlap on an outer rim or edge of the bush body 45). That is, as the engaging arms 91, 91 or the arm bodies 67, 67 open or spread apart sufficiently to allow the bush 43 to pass through therebetween or to allow the passing-through portions 55, 55 of the bush 43 and the bush body 45 of the bush 43 to pass through therebetween, the bush 43 is allowed to pass through the second wire retainer 89 and to be force-fitted in the seal holding portion 19. In the second quick connector 87, since the closing portions 53 of the bush 43 closes up the first in-and-outlet portions 38 and the second in-and-outlet portions 39, for example, partly, the second wire retainer 89 never dismounts from the connector housing 3 as far as the bush 43 is removed from the connector housing 3.

Figure 14:
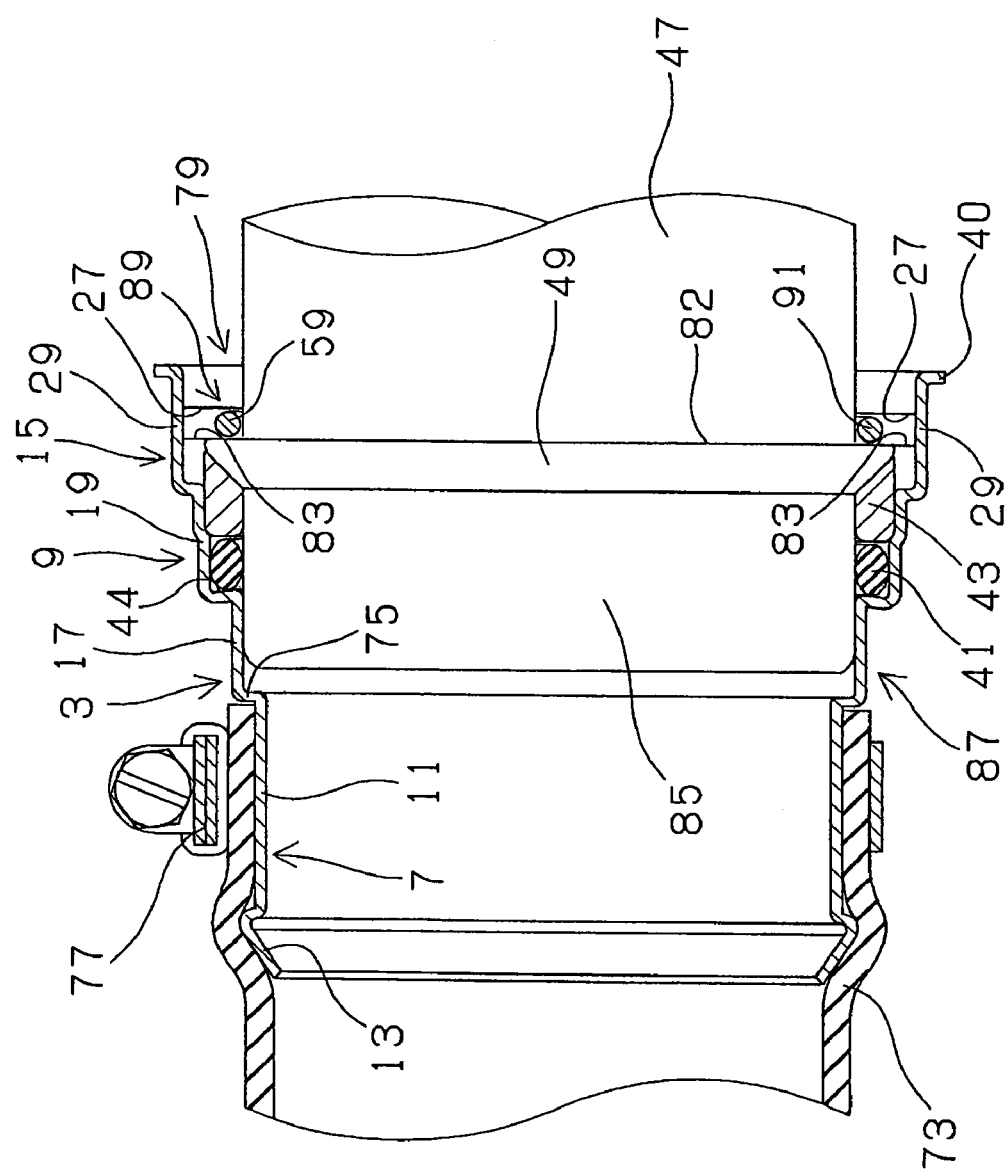
FIG. 14 is a sectional view taken in an axial direction, showing a state that a rubber hose and a pipe are connected to the second quick connector.

As shown in FIGS. 14 and 15, the rubber hose 73 and the pipe 47 are connected to the second quick connector 87 in the same mode as the first quick connector 1.

Figure 16:
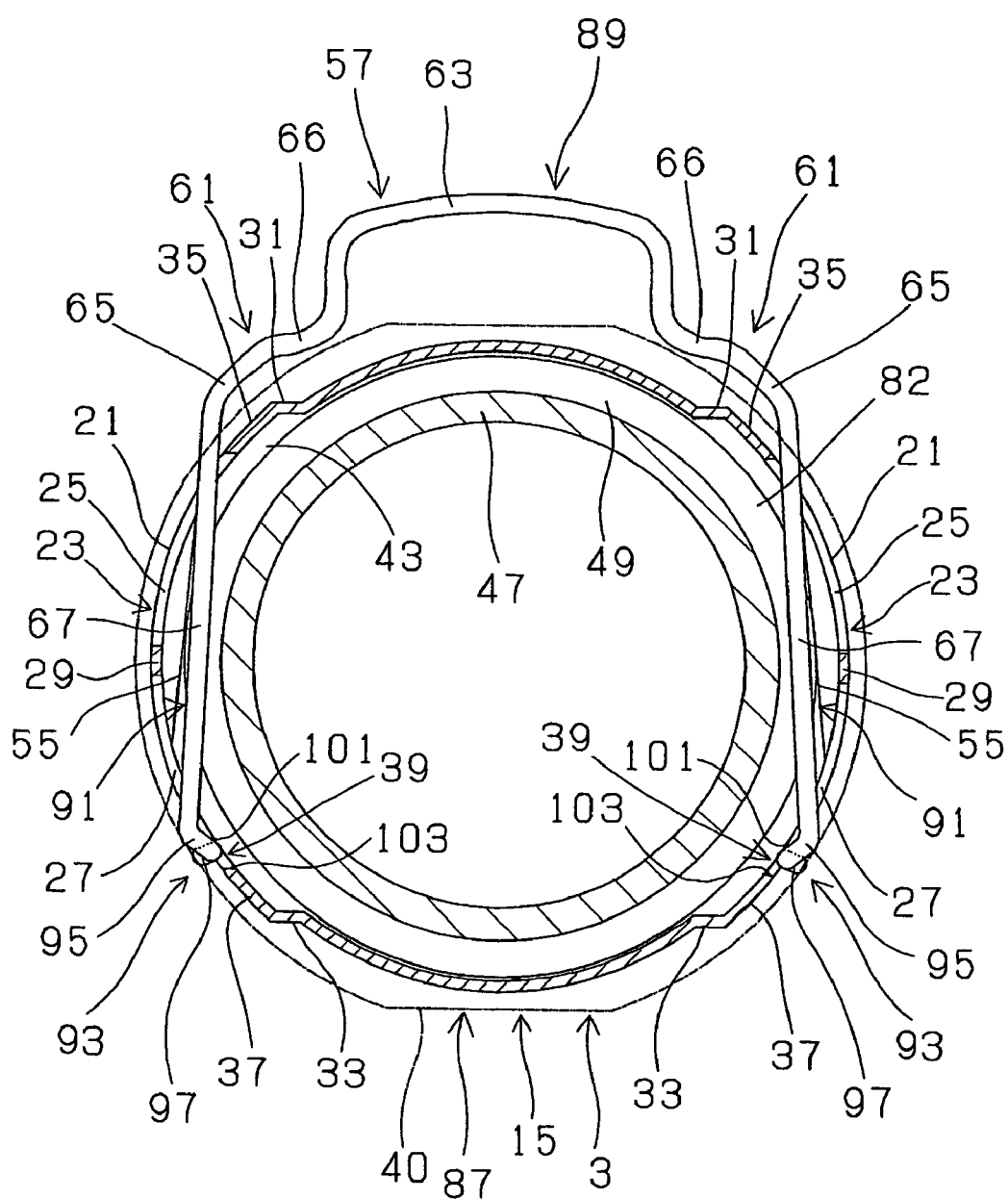
FIG. 16 is a view for explaining a motion of a second wire retainer for the second quick connector.

When, for example, pull-force or pull-out force (refer to an arrow B in FIG. 15) is exerted to the second wire retainer 89 which is retained in the mounted position (position shown in FIG. 15), the second wire retainer 89 moves in the pull-out direction, and the engaging arms 91, 91 gradually open or spread apart while sliding the engaging bodies 95, 95 of the engaging arms 91, 91 toward the second slit parts 27, 27 over an outer surface of the stop wall regions 37, 37 of the other circumferential end of the raised mounting portions 21, 21, respectively. As well shown in FIG. 16, when axial portions 97, 97 (curve start parts or ends of the curve start parts of the axial portions 97, 97) which are formed so as to be inclined outwardly toward a leading end (one axial direction) seat in the second in-and-outlet portions 39, and engage with one circumferential end portions 101 (stop portions, also refer to FIG. 13) of the second in-and-outlet portions 39, 39 in the pull-out direction (a stop position), the second wire retainer 89 cannot be moved further toward the pull-out direction (since the second in-and-outlet portions 39 are closed up by the block regions 53, 53 of the bush 43, for example, partly, the axial portion 97, 97 do not enter in the connector housing 3). Here, the engaging bodies 95, 95 are designed short in length. Therefore, the engaging arms 91, 91 or the arm bodies 67, 67 of the second wire retainer 89 open to a small extent, and the arm bodies 67, 67 do not open or spread apart sufficiently to release engagement with the annular engaging projection 49 of the pipe 47. Therefore, connection between the pipe 47 and the second quick connector 87 in stop relation is securely maintained even when the second wire retainer 89 is moved to the stop position.

And, in the stop position (a position shown in FIG. 16), the axial portions 97, 97 (curve start parts or ends of the curve start parts of the axial portions 97, 97) is in engaging state with the other circumferential end portions 103, 103 of the second in-and-outlet portions 39, 39, in the mounding direction, for example, with a slight gap. So, when the pull-force is released from the second wire retainer 89, the second wire retainer 89 is displaced toward the mounting direction until the axial portions 97, 97 (curve start parts or ends of the curve start parts of the axial portions 97, 97) engage with the other circumferential end portions 103, 103 of the second in-and-outlet portions 39, 39 in the mounting direction, and held in this state. In order to cancel this state, it is only necessary to forcibly push the second wire retainer 89 in the mounting direction. Meanwhile, even when the axial portions 97, 97 engage with the other circumferential end portions 103, 103, the arm bodies 67, 67 still engage with the annular engaging projection 49 of the pipe 47.

In the second quick connector 87, a width of the engagement slit 23 is set between 2.6 mm and 2.8 mm, and an outer diameter of a wire member of the second wire retainer 89, an outer diameter of the engaging arm 91 or an outer diameter of the arm body 67 is set 2.3 mm. And, a distance between one circumferential ends of the fist slit parts 25, 25 is designed equal to a distance between the other circumferential ends of the second slit parts 27, 27, and generally equal to an outer diameter (an outer diameter of a portion except for the annular engaging projection 49) of the pipe 47 (more specifically, the distance between one circumferential ends of the fist slit parts 25, 25, and the distance between the other circumferential ends of the second slit parts 27, 27 is slightly larger than the outer diameter of the pipe 47). Since a width of the engaging slit 23 is designed larger than a diameter of the arm body 67 (by 10% to 25% of the diameter of the arm body 67), the arm bodies 67 implement a positive snap action, the engaging stopper portions 95, 95 conflict the stop wall regions 37 of the connector housing 3 to generate a positive confliction noise. Here, the arm bodies 67 are not configured to conflict the outer periphery of the pipe 47. However, the arm bodies 67 may be configured to conflict the pipe 47 to generate a confliction noise.

An annular surface 82 of the other axial end of the annular engaging projection 49 is formed so as to expand radially or in a direction perpendicular to an axis, and is located at a position axially corresponding to or generally corresponding to one axial end extremity 83 of the engagement slit 23 when the annular surface of the one axial end of the annular engaging projection 49 abuts the inner peripheral surface of the receptacle portion 51 of the bush 43. Further, in order to ensure snap-engagement of the annular engaging projection 49 of the pipe 47 with the engaging arms 91, 91 or the arm bodies 67, 67, and in order to prevent slow down of snap-action of the engaging arms 91, 91 or the arm bodies 67, 67 due to slide movement of the engaging arms 91, 91 or the arm bodies 67, 67 over the annular engaging projection 49, the annular engaging projection 49 may be configured such that the annular surface of the other axial end of the annular engaging projection 49 is located slightly toward one axial direction with respect to the one axial end extremity 83 of the engagement slit 23 when the annular surface of the one axial end thereof is received in the bush 43.

A quick connector according to the present invention, for example, which is to be adapted to extreme thermophilic air hose in piping of an automobile or the like, secures prompt connecting work. And, the quick connector can be configured to secure a strong connection in a piping.

We claim:

1. A quick connector for connecting a pipe and a hose, comprising:
   a tubular connector housing provided at one axial end with a hose connector portion for being connected to the hose and at the other axial end with a pair of diametrically opposed engaging slits;
   a wire retainer of U-shape or generally U-shape having a pair of engaging arms, and mounted to the other axial end of the connector housing in such a manner that the pair of the engaging arms clip the connector housing while extending through a respective one of the engaging slits, the engaging arms of the wire retainer projecting through the respective one of the engagement slits into the connector housing, the engaging arms being configured to be brought in opening motion with the engaging arms being pushed by an annular engaging projection formed on an inserting end of the pipe that is inserted into the connector housing, and then in closing motion so as to engage with the annular engaging projection;
   wherein each of the engaging slits has a width larger than a diameter of the engaging arm in order to generate a collision noise by collision between the engaging arm and the connector housing or the pipe upon completion of the closing motion of the engaging arms,
   wherein each of the engaging arms has a leading end portion that is bent over or inclined radially inward to define an engaging portion,
   wherein the wire retainer is configured to move to a pull-out position where a leading end of the engaging portion engages a stop portion of the connector housing in a pull-out direction, while sliding the leading end of the engaging portion over an outer peripheral surface of the connector housing so as to gradually open the engaging arms,
   wherein the engaging portion is formed not to permit the engaging arms of the wire retainer to open sufficiently to be disengaged from the annular engaging projection of the pipe when the wire retainer reaches to the pull-out position,
   wherein the leading end of the engaging portion is provided with an axial portion that is bent over in the axial direction of the connector housing, the axial portion being configured to engage with the stop portion of the connector housing in the pull-out direction,
   wherein each of the engaging slits is provided with inlet and outlet slit portions extending in the axial direction, at circumferential end portions thereof, to allow the axial portion to slip in and out, at least the outlet slit portion being closed up at an inside of the connector housing after the wire retainer is mounted on the connector housing by inserting the axial portion in the inlet slit portion and projecting the axial portion out from the outlet slit portion, and the stop portion of the connector housing with which the axial portion engages being defined by a circumferential end portion of the outlet slit portion.

2. A quick connector as set forth in claim 1, wherein each of the engaging slits has a width 1.1 times to 1.3 times larger than a diameter of the engaging arm.

3. A quick connector as set forth in claim 1, wherein the inserting end portion of the pipe is configured so as to be inserted in the connector housing until an annular surface of the annular engaging projection at the other axial end conforms to or beyond one axial end extremity of the engaging slit.

4. A quick connector as set forth in claim 1, wherein the wire retainer is made of metal, and the connector housing and/or the pipe is also made of metal.

* * * * *